United States Patent
Hunter

(10) Patent No.: US 10,709,945 B2
(45) Date of Patent: Jul. 14, 2020

(54) GOLF-SWING MONITORING SYSTEM

(71) Applicant: Shot Scope Technologies Limited, Edinburgh (GB)

(72) Inventor: David Hunter, West Lothian (GB)

(73) Assignee: Shot Scope Technologies Limited, Edinburgh (GB)

( * ) Notice: Subject to any disclaimer, the term of this patent is extended or adjusted under 35 U.S.C. 154(b) by 0 days.

(21) Appl. No.: 15/306,067

(22) PCT Filed: Apr. 22, 2015

(86) PCT No.: PCT/GB2015/051190
§ 371 (c)(1),
(2) Date: Oct. 21, 2016

(87) PCT Pub. No.: WO2015/162423
PCT Pub. Date: Oct. 29, 2015

(65) Prior Publication Data
US 2017/0043228 A1     Feb. 16, 2017

(30) Foreign Application Priority Data
Apr. 24, 2014 (GB) .................. 1407240.9

(51) Int. Cl.
*A63B 60/46*     (2015.01)
*G06K 19/077*     (2006.01)
(Continued)

(52) U.S. Cl.
CPC .......... *A63B 60/46* (2015.10); *A63B 24/0003* (2013.01); *A63B 24/0062* (2013.01);
(Continued)

(58) Field of Classification Search
CPC .......... G06K 7/10366; G06K 19/07762; A63B 60/46; A63B 24/0062; A63B 24/0003; A63B 2102/32
See application file for complete search history.

(56) References Cited

U.S. PATENT DOCUMENTS 5,465,098 A * 11/1995 Fujisawa ................ H01Q 13/10
343/718
5,986,566 A * 11/1999 Yamamori ............ H01Q 1/273
340/7.63
(Continued)

FOREIGN PATENT DOCUMENTS

JP     H1043346 A     2/1998
JP     2003339929 A     12/2003
(Continued)

OTHER PUBLICATIONS

Berlin, et al., "Coming to Grips with the Objects We Grasp: Detecting Interactions with Efficient Wrist-Worn Sensors", Proceedings of the Fourth International Conference on Tangible, Embedded, and Embodied Interaction, 2010, pp. 57-64.
(Continued)

*Primary Examiner* — Michael D Dennis
(74) *Attorney, Agent, or Firm* — Perkins Coie LLP

(57) ABSTRACT

A system for automatically gathering information on a performance of an action involving an object being hit or struck, the system comprising at least one object contact sensor for detecting a contact with the object. Preferably one or more of the at least one object contact sensors comprises a shock and/or vibration sensor such as an accelerometer, and/or one or more of the at least one object contact sensors comprises a sound sensor; and the system is configured to at least partially detect shock and/or vibrations caused by contact with the object using the one or more shock and/or vibration sensors and/or at least partially detect sound gen-
(Continued)

erated by contact with the object using the one or more sound sensors to thereby detect contact with the object. A possible use of the system is as a system for automatically gathering information on a performance of an action performed by a player or user in a sport and/or on performance of a golf swing in which the object being struck is a golf ball being hit or struck by a golf club and the at least one object contact sensor is configured to detect contact between the golf club and golf ball.

23 Claims, 16 Drawing Sheets

(51) Int. Cl.
    *G06K 7/10*       (2006.01)
    *H01Q 1/27*       (2006.01)
    *H01Q 1/22*       (2006.01)
    *H01Q 1/40*       (2006.01)
    *G06K 19/07*      (2006.01)
    *A63B 24/00*      (2006.01)
    *A63B 102/32*     (2015.01)
(52) U.S. Cl.
    CPC ..... *G06K 7/10009* (2013.01); *G06K 7/10316* (2013.01); *G06K 7/10366* (2013.01); *G06K 19/0723* (2013.01); *G06K 19/07762* (2013.01); *H01Q 1/2216* (2013.01); *H01Q 1/273* (2013.01); *H01Q 1/40* (2013.01); *A63B 2024/0071* (2013.01); *A63B 2102/32* (2015.10); *A63B 2220/40* (2013.01); *A63B 2220/833* (2013.01); *A63B 2220/836* (2013.01); *A63B 2225/54* (2013.01)

(56) References Cited

U.S. PATENT DOCUMENTS

| | | | |
|---|---|---|---|
| 6,212,414 B1* | 4/2001 | Alameh | H04B 1/385 455/347 |
| 6,412,976 B1* | 7/2002 | Dechery | A44C 5/00 368/281 |
| 2009/0027206 A1* | 1/2009 | Chang | G06K 19/07345 340/572.3 |
| 2010/0099509 A1 | 4/2010 | Ahem et al. | |
| 2010/0130298 A1* | 5/2010 | Dugan | A63B 69/3623 473/223 |
| 2010/0321165 A1 | 12/2010 | Lee | |
| 2011/0086720 A1* | 4/2011 | Jaekel | A63B 24/0003 473/223 |
| 2011/0266343 A1 | 11/2011 | Liu | |
| 2013/0182382 A1 | 7/2013 | Vardi et al. | |
| 2013/0274040 A1* | 10/2013 | Coza | A63B 24/0062 473/570 |
| 2013/0326790 A1 | 12/2013 | Cauwels et al. | |
| 2014/0197951 A1* | 7/2014 | Savarese | A63B 60/00 340/540 |
| 2014/0297007 A1* | 10/2014 | Voutilainen | A63B 24/0003 700/91 |

FOREIGN PATENT DOCUMENTS

| | | |
|---|---|---|
| JP | 2013509968 A | 3/2013 |
| WO | WO2007069014 | 6/2007 |
| WO | 2014154932 A1 | 10/2014 |

OTHER PUBLICATIONS

Search Report and Written Opinion dated Jul. 24, 2015 for PCT Application No. PCT/GB2015/051190.
Anonymous "Flexible electronics—Wikipedia," Mar. 11, 2014, accessed Feb. 25, 2020 from https://en.wikipedia.org/w/index.php?title=Flexible_electronics&oldid=599115338; 7 pages.

* cited by examiner

250

GOLF-SWING MONITORING SYSTEM

FIELD OF INVENTION

The present invention relates to a monitoring system for gathering information on performance of an action, such as performance of a sporting action.

BACKGROUND OF INVENTION

It is often desirable for a player of a ball sport, such as golf, to record statistical information about their performance. Traditionally, golfers have recorded rudimentary information on score cards, but it has been very difficult to record in depth information such as the precise location where a shot was taken or the club that was used. Recently, the prevalence of portable devices such as smartphones has allowed additional information to be recorded on a digital scorecard. However, current solutions require the player to manually enter data into an electronic device or onto a piece of paper. Both actions interrupt the natural flow of a round of golf.

During a professional golfing tour, a system such as Shot Link (PGA Tour Inc.) may be used, in which a large number of volunteers manually record information on a golfer's performance. This involves the volunteers entering information on shots taken, as well as using laser distance measures at fixed locations to triangulate the current position of the golfer's ball. The whole system is supported by a network of computers and data processors. Whilst this gives a high level of positional accuracy, and other manually entered information, it does not scale to provide feedback to the individual golfer.

The Game Golf (Active Mind Technology, Inc.) product utilises a device that is clipped to a golfer's belt, and a number of RFID tags that are attached to each of the golfer's clubs. Before taking a shot, the golfer holds the tag on the club against the belt device until the belt device vibrates, letting the golfer know that the club has been detected. The system then records a shot as having taken place at that location, with that particular club. Should the golfer subsequently change their mind about which club to use, they must either record two shots or manually change the data after the game. Since the tagging of shots is a manual event, it is easy for a golfer to forget to do it, in which case some shots may not be logged. Furthermore, the act of manually tagging each shot still disrupts the flow of the game.

Additionally, such systems are highly specific to golf, and do not generalise to other sports which involve contact with a ball either with or without equipment such as a club, bat or racquet. In these sports, information such as the timing, number and location of shots taken by a player may be very useful.

It is an object of at least one embodiment of the present invention to provide an improved or alternative system for monitoring the performance of a player in a ball sport.

SUMMARY OF INVENTION

Various aspects of the present invention are defined in the independent claims. Some preferred features are defined in the dependent claims.

According to a first aspect of the present invention is a system for automatically gathering information on a performance of an action, such as an action performed by a player or user in a sport, e.g. a ball sport. The action may comprise use of a ball, racquet, bat and/or club, such as a golf club. The action may comprise at least one object striking another object. Examples of suitable sports include golf, baseball, tennis, badminton, squash or football.

The system may be configured to automatically detect when an object is hit or struck. At least one of the objects may comprise a ball, such as a golf ball. The object may be hit directly by the player or user or by a piece of equipment, which may be held or worn by the player or user. The system may comprise at least one object sensor, such as an object contact sensor. One or more of the at least one object contact sensors may be or comprise a shock and/or vibration sensor, such as an accelerometer, which may be configured or operable as the shock and/or vibration sensor. One or more of the at least one object contact sensors may be or comprise a sound sensor, such as a MEMS sound sensor or other microphone. The system may comprise both the at least one shock and/or vibration sensor and the at least one sound sensor.

The system may be configured to at least partially detect shock and/or vibrations caused by contact with the object, e.g. using the one or more shock and/or vibration sensors. The system may be configured to at least partially detect sound generated by contact with the object, e.g. ball, e.g. using the one or more sounds sensors. The system may be configured to use the at least one shock and/or vibration sensor in combination with the at least one sound sensor to at least partially detect object contact.

The system may comprise or is comprised in one or more portable devices. At least one of the portable devices may be or comprise a wearable device. The at least one wearable device may be wearable on a wrist, hand, or forearm of the player or user. The at least one wearable device may be or comprise a wrist worn device, preferably configured to be worn on the wrist of the upper hand of the player or user. For example, a portable device may be worn on the left wrist of a right-handed golfer, or the right wrist of a left-handed golfer.

The system may be adapted to automatically detect when a piece of equipment is being used. The system may be adapted to automatically detect which piece of equipment is being used. The piece of equipment may be or comprise a bat, racquet or club, such as a golf club. The system may be configured to automatically detect when the player is holding a piece of equipment, and/or may identify that piece of equipment. For example, the system may detect when the player is holding a golf club, and identify which golf club is being held.

The system may comprise or may be configured to communicate with one or more tags applied, affixed, affixable or mountable to the pieces of equipment. Each tag may be identifiable, preferably uniquely identifiable. The at least one tag may comprise, encode or transmit a unique identifier. Applying or affixing at least one of the tags to the piece of equipment may render the system able to detect and/or identify that piece of equipment. The at least one tag may utilise wireless communication. The at least one tag may be a passive tag. The at least one tag may utilise radio frequency communication, Near Field Communication (NFC), Wi-Fi, Bluetooth, and/or the like. The at least one tag may be or comprise a Radio Frequency Identification (RFID) tag. The at least one tag may comprise visual indicia, which may be used to detect and/or identify the tag and/or piece of equipment.

The at least one tag may be designed to be affixable or attachable to the piece of equipment, such as a golf club or tennis racquet. The tag may be designed to be attachable to a part of the equipment that is adjacent, proximate or gripped by the player or user. For example, a tag may be configured to screw into or otherwise attach to the top of a handle or grip of a golf club. The tag may be located or locatable at least partly inside the handle or grip of a golf club. The tag may be configured such that at least part or all of the tag is located or locatable underneath or within a grip or handle of the piece of equipment, e.g. golf club.

The system may comprise a tag reader. The tag reader may utilise a corresponding mode of communication to that used by the at least one tag. The tag reader may be or comprise a wireless tag reader. The tag reader may comprise an antenna for transmitting and/or receiving electromagnetic radiation. The tag reader may comprise an RF or NFC antenna. The tag reader may receive data from and/or send data to the at least one tag.

The tag reader may be comprised in or mounted or mountable on the at least one portable device (e.g. the at least one wearable device). For example, the tag reader may be comprised in or mounted or mountable on the wrist worn device. The tag reader may be partially or wholly comprised in or mounted or mountable on a strap, e.g. of the wrist worn device. The tag reader may be partially or wholly comprised in or mounted or mountable on a face of the wrist worn device. The system may be configured such that all or part of the tag reader is located or locatable on the underside of a wrist of the player. The tag reader may comprise an antenna, wherein at least part or a whole of the antenna may be configured to be situated on the underside of a wrist of the player. The system may comprise an antenna comprised in or around the strap of the wrist worn device, for example configured such that it is positioned or positionable on the underside of a player's wrist.

The strap may be connectable/disconnectable and/or adjustable, e.g. to vary an adjustment position, circumference, configuration or length of the strap. The system may comprise a strap sensor, which may be configured to determine, e.g. automatically determine, the adjustment position, circumference, configuration or length of the strap or data indicative thereof.

The antenna may extend along or around at least part or all of the strap. A size, length, configuration or electrical and/or magnetic property of the antenna may be dependent on the adjustment position, circumference, configuration or size of the strap.

The system may be configured to adjust, e.g. automatically adjust, at least one operating parameter of, or compensation for, the antenna based on the determined adjustment position, circumference, configuration or size of the strap or data indicative thereof.

The system may comprise a plurality of matching circuits or systems, which may each have a differing electrical property, such as impedance, capacitance and/or inductance, and/or an adjustable matching circuit or system. The matching circuits or systems may comprise an inductor and/or capacitor bank or matched filter, which may each have a differing inductance and/or capacitance, and/or a circuit or system having a variable inductance or capacitance. The adjustment of the at least one operating parameter of the antenna may comprise selecting or adjusting the electrical property of the at least one matching system. The system may be configured to select and/or vary one or more of the matching circuits or systems based on the determined adjustment position, circumference, configuration or length of the strap or data indicative thereof.

The strap sensor may comprise or be in communication with one or more first contacts, which may be distributed longitudinally along a first end or part of the strap. The position detector may comprise or be in communication with one or more second contacts, which may be distributed longitudinally along a second end or part of the strap. One or more of the first contacts may contact or be selectively contactable with one or more of the second contacts when the strap is closed or secured. The contacts between the one or more of the first contacts and the one or more of the second contacts, and optionally thereby at least one electrical property such as resistance measurable by the strap sensor, may differ depending on the adjustment position, circumference, configuration or size of the strap. The one or more first and second contacts may be linked by a conductor, e.g. a wire, which may allow a circuit to be completed by the contact between the one or more first and second contacts. The system may be configured to determine the adjustment position, circumference, configuration or size of the strap based on the at least one electrical property, e.g. of the measurement circuit, measured by the strap sensor.

The first and second contacts may be selectively fittable, e.g. press fittable, together. The antenna, the first and/or second contacts and/or the conductors linking the wire may be formed as part of a flexible printed circuit board (PCB).

In this way, the system may be configured to automatically adjust for differences in size, length, configuration or electrical and/or magnetic property of the strap based antenna due to changes in adjustment position, circumference, configuration or length of the strap. This may help to maintain a more constant performance level and/or sensing range of the antenna, regardless of the adjustment position, circumference, configuration or length of the strap.

The system may be configured to determine proximity between the tag and/or tag reader. For example, the system may be configured to determine when a piece of equipment is being held, e.g. when the at least one tag on the piece of equipment is adjacent or proximate to all or part of the tag reader. The tag and the tag reader may be proximate when they are within a fixed range or threshold distance of each other, which may comprise or be dependent on a transmission or operating range of the tag and/or tag reader. The system may be configured to determine when the object is being held based on the determined proximity. For example, the system may comprise a tag located at the top, or otherwise around, the grip of a golf club, and a wrist worn device with an antenna in the strap. In this way the wrist worn device may detect and communicate with the tag without the need for the player to perform any actions other than those normally associated with playing the sport.

For example, the system may comprise a wrist worn device with an RFID antenna in the strap, worn on the left wrist of a right handed golfer. The system may also comprise an RFID tag affixed to the top of each of the golfer's clubs. When the golfer assumes a grip, their left wrist will be brought in close proximity to the top of the golf club. This may allow the tag reader to communicate with the tag, and both detect that the player is holding a club in a grip, and identify which club is being held.

The system may comprise one or more swing sensors. The at least one swing sensor may be or comprise one or more inertial sensors, for example accelerometers and/or gyroscopes. The at least one swing sensor may comprise or be comprised in the one or more shock and/or vibration sensors. The system may monitor for a prescribed swing motion using the at least one swing sensor. The system may activate the at least one object sensor due to or responsive to readings from the at least one swing sensor. The system may activate the at least one object sensor for a period of time during a swing motion. The system may activate the at least one swing sensor due to the piece of equipment being detected.

For example, the system may detect that a player is holding a piece of equipment, and may then activate the at least one swing sensor, e.g. responsive to the detection that the piece of equipment is being held. The at least one swing sensor may detect that a swing motion is being performed, and the system may selectively activate the at least one object sensor for a period during the swing.

The system may comprise a swing detector. The swing detector may comprise or communicate with the at least one swing sensor. The swing detector may comprise a reactive system for real-time detection of swing motions and optionally may act to activate the at least one object sensor. The swing detector may comprise a non-reactive system, which monitors the data from the at least one swing sensor to detect when a swing happened. The swing detector may comprise a matched filter or the like.

The swing detector may comprise a finite state machine, or the like. That is to say, the swing detector may monitor the at least one swing sensor, for predefined motion ranges, which may be in a predefined order and optionally in predefined time windows. In this way, the swing detector may be configured with one or more patterns of movements which nominally describe a swing, and may monitor the at least one swing sensor to detect such motions or patterns, e.g. in order to identify performance or characteristics of a swing. Such patterns may be or comprise ranges or patterns in the spatial and/or temporal domains. The swing detector may monitor the at least one swing sensor for readings within a defined range, which may indicate a motion is occurring, and may then monitor for another motion indicative of the next stage of a swing. This process may be repeated to monitor for and detect a swing motion. Each step of the motion may be allocated a time window. If the step of the motion is not detected within that time window, the swing detector may reset back to the start of the motion.

The swing detector may be configured to detect a golf swing, i.e. using a golf club. The swing detector may be configured with one or more patterns which nominally describe swing motions, such as golf swings. For example, the system may detect when the payer or user (e.g. a golfer) is initiating a back swing by monitoring the at least one swing sensor and detecting when the readings are within a predefined range associated with initiating a back swing. The system may then begin looking for sensor readings which indicate that a back swing is in progress. A time window may be allocated for this, and if no matching sensor readings are found within this time window, the process may reset. If a back swing is detected, the system may start to look for sensor readings which indicate a transition phase of the swing is occurring, and so on. During the portions of the swing where contact with a ball would be expected, the system may activate and/or monitor the at least one object sensor.

As a related example, the swing detector may be activated by a golfer gripping a club, which may be identifiable as a putter, e.g. using an identifier associated with that club. The swing detector may detect that the golf club is being moved, or held, in a position or motion indicative of a putting shot.

The swing detector may be configured to monitor for different types of swing, optionally simultaneously. The swing detector may be configured to identify the type of object or equipment (e.g. putter, driver, pitching wedge, etc.) being gripped or held by the player or user and may be configured to selectively monitor for one or more types of swing associated with that object or equipment.

The swing detector may be configured to detect motions such as a tennis swing, or a kicking motion.

The information gathered by the system may comprise one or more of: location data, time data, equipment type and/or ID data, swing data, swing type data, shot count, and/or internal variables from the at least one portable device. The swing data may comprise or be derived from readings from the at least one swing sensor and/or the at least one object sensor. The swing type data may comprise or be derived from the at least one swing sensor, the at least one object sensor and/or internal variables of the at least one portable device. For example, the swing detector may be comprised within the portable device, and may be configured to monitor for several different motion types. The information may then comprise swing type data which may include information on the type of motion detected and/or whether or not an object contact was detected during the motion.

The system may comprise data storage for storing the information. The data storage may comprise RAM, EEPROM, Flash memory, magnetic storage or the like. The data storage may comprise or be comprised in a microcontroller, or may comprise separate Integrated Circuits. The data storage may comprise a removable storage interface, such as an interface for microSD cards, SD cards, USB memory drives or the like. The data storage may comprise one or more data storage instances, each of which comprises EEPROM, flash memory, an SD card interface and/or the like.

The system may comprise one or more communication interfaces, such as Bluetooth, Wi-Fi, NFC, USB, and/or the like. The system may send and/or receive data through the one or more communication interfaces. The system may send all or part of the information through the one or more communication interfaces.

The received data may comprise location information, time information, and/or other contextual information. The received data may comprise additional information on the performance of the action. For example, the system may receive location and time information from a consumer or user device, such as GPS data. The system may receive information entered by the user into the consumer or user device.

For example, the system may communicate with a smartphone or other consumer or user device through the communication interface. It may then send the information on performance of the sport, swing, action or motion to the consumer or user device. The system may be or comprise a golf monitoring system, and may receive information entered by the user relating to penalties, corrections, and the like.

The system may comprise a GPS location device or other device for providing location information. The GPS location device may provide the location and/or time information.

The system may be able to differentiate between practice swings and real swings, wherein contact with the object occurs in a real swing. The system may use the one or more object contact sensors to determine whether or not contact with the object occurs during a swing. The information may comprise information only on or associated with real swings and/or on practice swings as well as real swings.

The system may use the location information from a cluster of swings in order to determine the final location of a real swing. The cluster of swings may be clustered in the time and/or spatial domains. The cluster of swings may comprise a real swing and one or more practice swings. The system may average, smooth or otherwise utilise the location information from each of the swings in the cluster of swings in order to determine the final location. For example, in a game of golf a player will often take numerous practice swings before taking a real swing. These practice swings tend to be close to where the player's ball is and hence where the real swing will occur. Using the location information from a cluster of swings, including a number of practice swings and a real swing, may allow a more accurate determination of the location where the real swing was taken.

The system may comprise one or more user interfaces. The one or more user interfaces may comprise buttons, scrollers and/or the like, for example push buttons, potentiometers or capacitive sensors. The one or more user interfaces may comprise a touch screen. The one or more user interfaces may comprise voice and/or gesture control. The one or more user interfaces may comprise or use the one or more object contact sensors, for example accelerometers, gyros and/or microphones. The one or more user interfaces may comprise or communicate with the one or more communication interfaces.

The system may receive data from the one or more user interfaces. The data received from the one or more user interfaces may comprise additional information on the performance of the action. For example, the system may be or comprise a golf monitoring system, and may comprise a push button on a wearable device, which the player may push to register that they have received a penalty. The data received may relate to the control of the system, for example starting/stopping or pausing/resuming monitoring.

The system may comprise one or more output devices. The one or more output devices may be comprised in the one or more portable devices. The one or more output devices may comprise LEDs, display screens, speakers, vibrating motors, or the like. The one or more output devices may comprise or communicate with the one or more communication interfaces.

The system may send data to the one or more output devices. The data sent to the one or more output devices may comprise all or part of the information on the performance, information of the state of the system, contextual information such as time or location, and/or the like.

For example, the system may use the one or more output devices to indicate if a shot or real swing has been detected. If the player or user has just made a very soft shot, the player or user may wish to confirm that it has been detected. Should detection have failed, the player or user may log the shot using the one or more user interfaces. In a related example, the system may detect that a player or user is holding a piece of equipment, but there may be uncertainty in the detection of a real shot. The system may then alert the player or user to this uncertainty using the one or more output devices, and may request clarification from the player or user. The clarification may comprise the player or user interacting with the one or more user interfaces, for example pushing a button, if a shot did or did not take place. The clarification may comprise the system displaying to the player or user its assumption on shot detection. The player or user may then confirm or correct the assumption. Confirming the assumption may comprise no action from the player or user.

The system may comprise or use maps or other location specific information. The location specific information may be comprised in the contextual information sent and/or received through the one or more communication interfaces and/or output through the one or more output devices.

The system may be configured to use the maps or other location specific information after the monitoring has been completed, for example in order to interpret the information on the performance of the action. For example, the system may be or comprise a golf monitoring system, and may comprise or use maps of golf courses in order to determine where a player is or was on a course relative to the landmarks of that course. This may allow the determination of which hole each recorded swing corresponds to, and may facilitate analysis of the information.

The system may comprise one or more controllers or processors. The one or more controllers or processors may be or comprise or be comprised in electronic circuits and may be or comprise one or more microcontrollers, ASICs, FPGAs, SoCs, memory chips, and/or other digital or analogue circuitry. At least one of the one or more controllers may be comprised in the one or more portable devices. The one or more controllers may comprise, be comprised in, be connected or connectable to or be configured to communicate with the one or more communication interfaces, the one or more data storage instances, the one or more output devices, the one or more user interfaces, the swing detector, the one or more object sensors, the location sensing device, the tag reader and/or other electronic hardware.

The system may be configured to communicate with one or more remote servers through the at least one communication interface. The system may be configured to send the gathered information, additional information, internal variables from the at least one portable device, and/or data derived therefrom. The system may be configured to receive the maps or other location specific information from the one or more remote servers. The system may be configured to communicate with the one or more remote servers via a consumer device, such as a smartphone, tablet or personal computer.

For example, the system may be configured to upload all or part of the gathered information and additional information to a website and/or server. This may allow the player or user to then login to that website in order to access the uploaded information, and/or analysis of the uploaded information.

In general, the system may analyse or be configured to allow analysis of the gathered information, in order to produce statistical data. The statistical data may be displayed to the player or user, for example on a consumer device such as a smartphone, or on a website. For example, in a golf monitoring system, the statistical data may include one or more of: the club used on each shot; distance each shot travels; fairways in regulation; greens in regulation; putts per round; longest drive; sand saves; total number of shots; average distance with each club; longest drive; bounce back percentage; and/or up and down percentage. At least some of these statistics may be derived from information gathered over multiple games.

The system may be configured to maintain and/or automatically update an electronic scorecard. The system may be configured to determine when a real swing shot (i.e. a shot in which contact is made with the object or ball) is performed or played and to automatically update the scorecard accordingly.

Whilst the examples given above primarily relate to golf, a skilled person would understand that the system is equally usable for a variety of actions. For example, the system may be a football monitoring system and may comprise one or more ankle or leg worn devices, or devices attached to or integrated into boots. The system may then detect when and/or where the player kicks the ball, and log this information, in addition to optionally storing information about the player's movements during a game. Similarly, the system may be a tennis monitoring system, for example using one or more wrist worn devices, or a device integrated into a racquet. In general, the device may be worn or wearable on a limb.

Additionally, the term sound sensor does not limit such a sensor to any specific range of frequencies, and is intended to cover any transducer of acoustic waves.

According to a second aspect of the present invention is a portable device comprising or comprised within or configured for use with a system according to the first aspect of the present invention.

The portable device may be a wearable device, for example a wrist mounted device.

The portable device may comprise one or more object sensors, such as shock and/or vibration sensors, inertial sensors, acoustic sensors and/or the like. The portable device may comprise one or more accelerometers, gyroscopes and/or sound sensors.

The portable device may comprise one or more tag readers, which may be configured to communicate with one or more tags, wherein the one or more tags may be configured to be attached, affixed, affixable or mountable to pieces of equipment. For example, the portable device may comprise an RFID reader.

The portable device may comprise one or more communication interfaces, for example Bluetooth, Wi-Fi, USB, and/or the like.

The portable device may comprise data storage, for example EEPROM, flash memory, and/or one or more interfaces for SD cards, USB memory drives and/or the like.

The portable device may comprise a location sensor, such as a GPS location device.

The portable device may comprise one or more output devices, such as LEDs, displays, speakers, vibration motors and/or the like. The portable device may comprise one or more user interfaces, such as push buttons, touch screens, voice control and/or the like.

The portable device may be rechargeable through the one or more communication interfaces, for example through a USB connection.

According to a third aspect of the present invention there is a tag for use in a system according to the first aspect of the present invention and/or with a portable device according to the second aspect of the present invention.

The tag may be identifiable, for example uniquely identifiable. The tag may comprise, encode and/or transmit a unique identifier. The tag may be compatible with a wireless communication system, for example RFID, NFC, Bluetooth, Wi-Fi, or the like. The tag may be a passive tag. The tag may be or comprise an RFID tag. The tag may comprise visual indicia for detecting and/or identifying the tag.

The tag may be configured to allow communication with the tag reader of a portable device according to the second aspect of the present invention.

The tag may be configured to be attachable or affixable to a piece of sporting equipment such as a club, bat and/or racquet. For example, the tag may be configured to screw into the top of a golf club or fit otherwise around the grip of the club. The tag may be configured such that at least part or all of the tag is located or locatable underneath or within a grip or handle of the piece of equipment, e.g. golf club.

According to a fourth aspect of the present invention is a system comprising one or more portable devices according to the second aspect of the present invention and one or more tags according to the third aspect of the present invention.

According to a fifth aspect of the present invention is a method for automatically gathering information on the performance of an action, such as an action performed by a player in a sport, e.g. a ball sport. The action may comprise use of a ball, racquet, bat and/or club. The action may comprise at least one object striking another object. Examples of suitable sports include golf, tennis, badminton, squash, baseball and football.

The method may comprise automatically detecting when an object is hit. The object may be or comprise a ball. The object may be hit directly by the player or user, or by a piece of equipment, which may be held or worn by the player or user.

The method may comprise measuring movement, for example using one or more motion or inertial sensors such as accelerometers and/or gyroscopes. The method may comprise measuring shock and/or vibration, for example using one or more accelerometers. The method may comprise measuring sound, for example using one or more sound sensors such as MEMS sound sensors or other microphones.

The method may comprise using one or more inertial sensors to detect that a swing motion is being performed. The method may comprise using one or more shock and/or vibration sensors to at least partially detect contact with the object. The method may comprise using the one or more sound sensors to at least partially detect contact with the object. The method may comprise using the one or more shock and/or vibration sensors in combination with the one or more sound sensors to at least partially detect contact with the object.

The method may comprise at least partially detecting contact with the object using shock and/or vibration caused by that contact. The method may comprise at least partially detecting contact with the object using sound generated by that contact. The method may comprise at least partially detecting contact with the object using the shock and/or vibration in combination with the sound generated by that contact.

The method may comprise detecting the presence and/or proximity of a piece of equipment, for example by detecting a tag attached to that piece of equipment. The method may comprise identifying the piece of equipment.

The method may utilise a system according to the first or fourth aspects of the present invention. The method may utilise one or more portable devices according to the second aspect of the present invention. The method may utilise one or more tags according to the third aspect of the present invention.

The method may comprise selectively activating motion and/or object sensors in response to a piece of equipment being detected. The method may comprise selectively activating object sensors and/or object contact sensors in response to a swing motion being detected.

For example, the method may comprise one or more of the steps of: detecting the presence of a piece of equipment; monitoring for a swing motion; detecting a swing motion and activating object sensors during that motion; and detecting contact with an object from shock and/or vibrations in combination with sound generated by that contact.

The method may comprise a reactive method for real-time detection of swing motions and optionally may comprise activating the at least one object sensor. The method may comprise a non-reactive method, which may comprise monitoring the motion data to detect when a swing happened. The method may comprise using a matched filter or the like.

The method may comprise monitoring for predefined motion ranges in a predefined order and optionally in predefined time windows. In this way, the method may utilise one or more patterns of movements which nominally describe a swing, and may comprise monitoring the motion sensors to detect such motion. Such patterns may be or comprise ranges of patterns in the spatial and/or temporal domains. The method may comprise monitoring for motions within a defined range which indicate a particular motion is occurring, and may comprise then monitoring for another motion indicative of the next stage of a swing. This process may be repeated to monitor for and detect a swing motion. Each step of the motion may be allocated a time window. The method may comprise resetting back to the start of the motion if the step of the motion is not detected within that time window.

The method may detect a golf swing, i.e. using a golf club. The method may monitor for one or more patterns which nominally describe swing motions, such as golf swings. For example, the method may comprise detecting when the player or user (e.g. a golfer) is initiating a back swing by monitoring the at least one motion sensor and detecting when the readings are within a predefined range associated with initiating a back swing. The method may comprise then looking for sensor readings which indicate that a back swing is in progress. A time window may be allocated for this, and if no matching sensor readings are found within this time window, the process may reset. If a back swing is detected, the method may comprise looking for sensor readings which indicate the transition phase of the swing is occurring, and so on.

The method may comprise monitoring for different types of swing, optionally simultaneously. The method may comprise identifying the type of object or equipment (e.g. putter, driver, pitching wedge, etc.) being gripped or held by the player or user and selectively monitoring for one or more types of swing associated with that object or equipment.

The method may detect motions such as a tennis swing, or a kicking motion, by monitoring for patterns which nominally describe such motions. The method may detect object contact during such motions in the manner described above.

The method may comprise storing and/or transmitting the gathered information. The gathered information may comprise one or more of: location data, time data, equipment type and/or identification data, swing data, swing type data, shot count, and/or any other contextual data. The swing data may comprise or be derived from the measured movement, the measured shock and/or vibrations, and/or the measured sounds.

The method may comprise taking in additional information from the player or user. For example, in a game of golf the player or user may manually provide information on penalties, corrections, and/or the like.

The method may comprise displaying or otherwise outputting all or part of the gathered information to the player or user.

The method may comprise using maps or other location specific information to facilitate the interpretation of the gathered information. For example, a map of a golf course may be used to determine which detected shots correspond to which holes.

According to a sixth aspect of the present invention is a computer program product configured to implement the system according to the first or fourth aspects, the portable device according to the second aspect, the tag according to the third aspect and/or the method of the fifth aspect.

According to a seventh aspect of the present invention is a processing apparatus when programmed with the computer program product of the sixth aspect.

According to an eighth aspect of the present invention is a carrier medium comprising, storing or encoding the computer program product of the sixth aspect.

According to a further aspect of the present invention is a system for automatically gathering information on a performance of an action involving an object being hit or struck. The system may comprise one or more swing sensors, the at least one swing sensor being or comprising one or more inertial sensors. The system may be configured to detect swing motions based at least in part on the data received from the swing sensor. The swing detector may be configured to monitor the at least one swing sensor for predefined motion ranges in a predefined order and/or in predefined time windows. The swing detector may be configured with one or more patterns of movements which nominally describe a swing, and monitors the at least one swing sensor to detect such motions or patterns, e.g. in order to identify performance or characteristics of a swing.

The patterns may be or comprise ranges or patterns in the spatial and/or temporal domains. The swing detector may be configured to monitor the at least one swing sensor for readings within a defined range indicative of a motion occurring, and may then monitor for another motion indicative of a next stage of a swing. The piece of equipment may be a golf club and/or the swing detector may be configured to detect a golf swing, and optionally the swing detector may be configured with one or more patterns that nominally describe golf swings.

The system may comprise one or more features described above in relation to the first aspect.

According to another aspect of the present invention is a system for automatically gathering information on a performance of an action involving a swinging motion of an object, piece of equipment or golf club, the system comprising or configured to communicate with a tag reader for reading the tags, the tag reader being comprised in or mounted or mountable on a wrist worn portable device, the tag reader being configured to communicate with one or more tags applied, affixed, affixable or mountable to the object, piece of equipment or golf club, wherein each tag comprises, encodes or transmits an identifier and the system is configured to determine which piece or what type of equipment or golf club is being used based on the identifier.

It will be appreciated that features analogous to those described in relation to any of the above aspects may be individually and separably or in combination applicable to any of the other aspects.

Apparatus features analogous to, or configured to implement, those described above in relation to a method and method features analogous to the use and fabrication of those described above in relation to an apparatus are also intended to fall within the scope of the present invention.

DETAILED DESCRIPTION OF DRAWINGS

Figure 1:
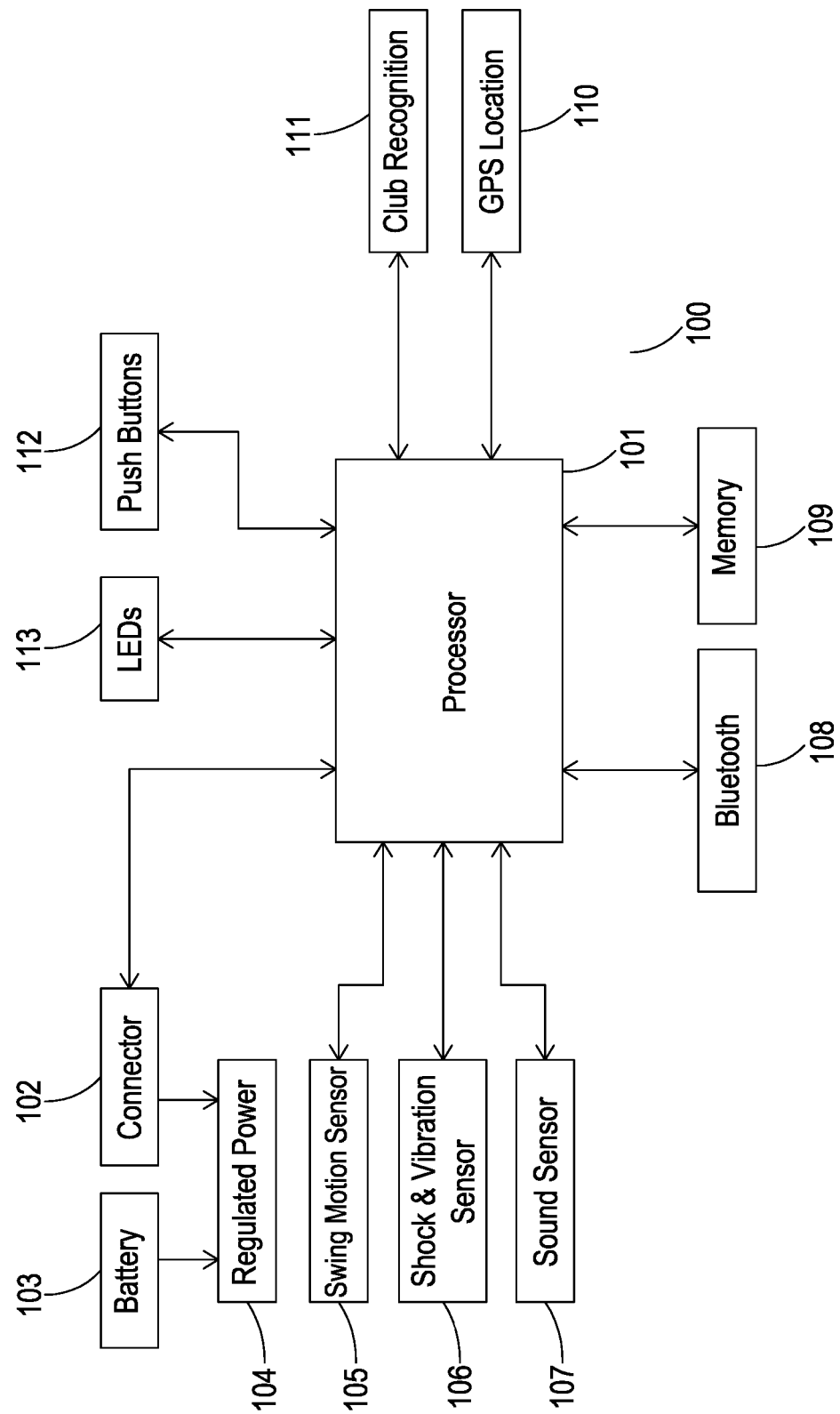
FIG. 1 is a schematic of a portable device.

FIG. 1 shows a portable device 100 for gathering information on the performance of a golf player. The device 100 comprises a processor 101 which acts as a controller, a connector 102 which acts to provide a power and data link, a battery 103, and a power regulator 104.

The device 100 comprises a swing motion sensor 105, a shock and vibration sensor 106 and a sound sensor 107. The swing motion sensor 105 detects motion of the device 100 in three dimensional space, advantageously sensing rotations as well as translations. The shock and vibration sensor 106 is used to detect the effects of impact in terms of forces up the golf club, and is used in the detection of ball contact during a swing. The sound sensor 107 is used to detect the acoustic waves generated by hitting a ball.

The device 100 comprises a Bluetooth module 108, which allows the device 100 to communicate, for example with consumer devices such as smartphones and tablets. In this way, the device 100 can send the information it has gathered, such as data or data derived from the swing motion sensor 105, shock and vibration sensor 106 and/or sound sensor 107, and/or data it has previously received. The device 100 is configured to receive additional information or contextual information, for example regarding penalties, location or time data, and such. A memory module 109 of the device 100 is used to store the gathered information, as well as other relevant data.

The device 100 comprises a GPS location module 110, which is used to rack the position of the device. In other embodiments, the location information is retrieved through the Bluetooth module 108 from a separate device, such as the consumer device.

The device 100 implements or comprises a club recognition module 111, which detects when a player is holding a club 304 (see FIG. 3) by detecting a tag 305 (see FIG. 3) on that club 304. The club recognition module 111 communicates with, or simply receives data from, the tag 305 in order to identify which club 304 the player is holding. For example, the club recognition module 111 may retrieve a unique identification code from the tag 305 on the club 304 and determine the club 304 therefrom.

In use, the device 100 detects that the player is holding a club 304 (see FIG. 3) using the club recognition module 111. The device 100 identifies that club 304 and can advantageously associate that identification with a club type, for example putter or driver. Upon identification of the club, the device 100 activates the swing motion sensor 105 and begins to monitor for patterns of movement that indicate a swing is occurring. When a swing is initiated by the player, the device 100 detects that this is happening, and activates the shock and vibration sensor 106 and the sound sensor 107. During the portion of the swing in which contact with the ball 702 (see FIG. 7) would be expected to occur, the device 100 monitors the outputs from the shock and vibration sensor 106 and sound sensor 107, and uses these readings in combination to determine whether or not contact with the ball 702 occurred.

If contact with the ball is detected, the device 100 stores the gathered information for the swing, including the time, location, shot count, swing data, club ID, etc., on the memory module 109. The device 100 may also send this information via the Bluetooth module 108, for example to a consumer device such as a smartphone, tablet, or laptop.

If contact with the ball is not detected, the device 100 determines that the swing was a practice swing. Depending on configuration settings, the device can still store the information relating to the practice swing, as this may be useful to the player and/or be helpful in later analysis of the data.

If there is some uncertainty over whether or not a real swing was performed, the device 100 may record this uncertainty. The device 100 can also prompt the player, either through the Bluetooth module 108 or LEDs 113, to confirm whether or not a shot took place. The player can then confirm or correct the decision, using push buttons 112 or using their smartphone through the Bluetooth module 108.

In the case where the device 100 detects one or more practice swings, followed by a real swing, in relatively quick succession and optionally without much movement, the device may use the location data from each swing in this cluster of swings to improve accuracy.

The LEDs 113 are used to display status information, for example whether or not the device 100 is logging information. The LEDs 113 may also provide the player with feedback on the information being gathered by the device 100. For example, the device 100 may turn an LED 113 on for a period of time after a shot or real swing has been detected.

The push buttons 112 are used to control the device and provide additional information. The gathering of information can be started/stopped or paused/resumed. Furthermore, in some embodiments the player can press a button 112 to record when they have received a penalty.

In some embodiments, the device 100 is configured to be worn on the wrist of the golfer, preferably the upper wrist. For a right-handed golfer, it would be worn on the left wrist, and vice-versa for a left handed golfer. This means that the device 100 is brought into close proximity to a tag affixed to the top of the grip on the club when the golfer is holding the club ready to take a swing.

Figure 2:
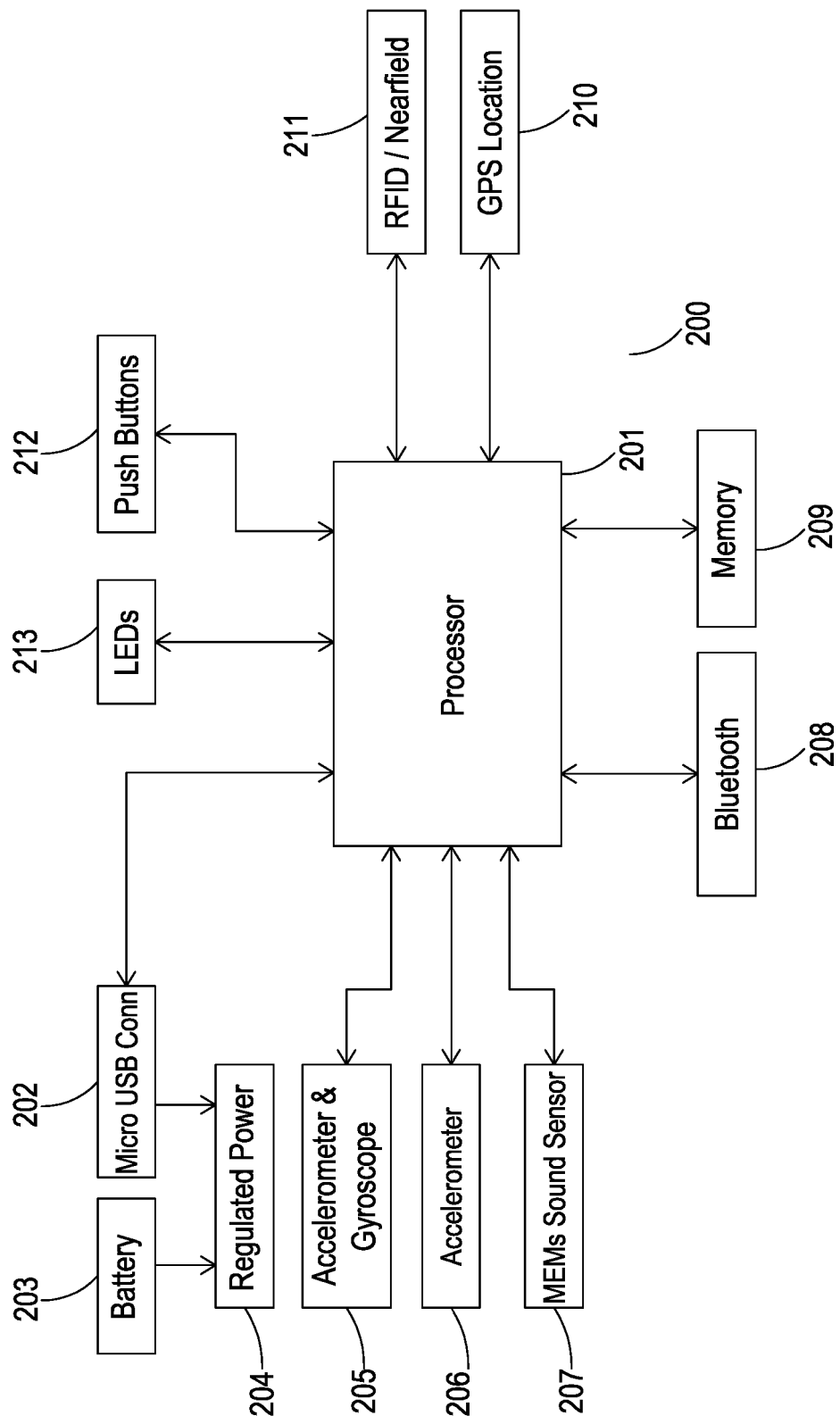
FIG. 2 is a schematic of an alternative portable device.

FIG. 2 shows a more specific embodiment of the same device of FIG. 1. The processor 201, battery 203, power regulator 204, Bluetooth module 208, memory module 209, GPS location module 210, push buttons 212 and LEDs 213 all perform the same functions as their equivalents shown in FIG. 1.

The device 200 comprises a micro USB connector 202 for example, which serves as the connector 102, and provides both a data link and power to recharge the battery 203. The swing motion sensor 103 is provided by an inertial sensor module, in the form of an accelerometer and gyroscope module 205. The shock and vibration sensor 106 is provided by an accelerometer module 206. In some embodiments, the accelerometer and gyroscope module 205 is operable as the accelerometer module 206. In other embodiments, different accelerometers may be used. The sound sensor 107 is provided as a MEMS sound sensor 207.

Figure 3:
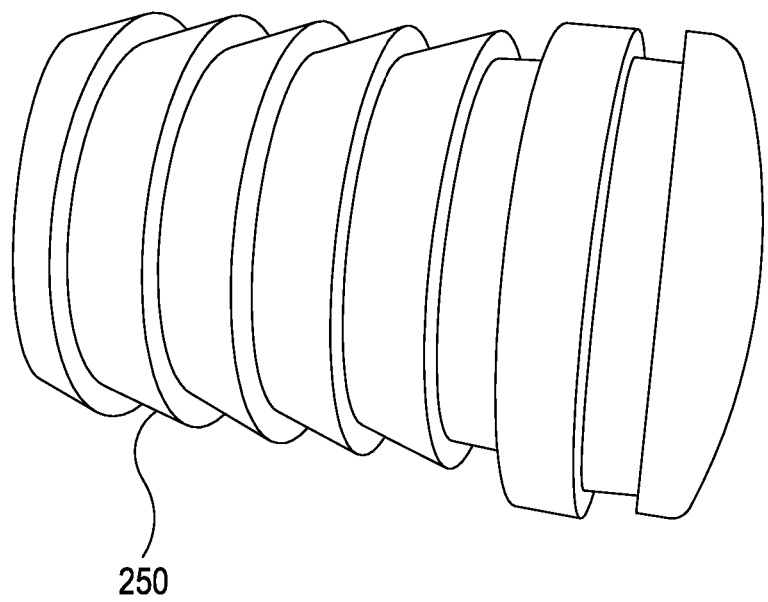
FIG. 3 is a tag for attaching under the grip of a golf club.

In this embodiment, the clubs are detected through RFID or NFC, and the club recognition module 111 or tag reader comprises an RFID or NFC module 211. The RFID tags read by the device 200 each comprise a unique identification code, which can be associated with a particular club. The tags are configured to be attachable to the grips of the golf clubs, for example by being screwed or otherwise affixed to the top of the grip. Advantageously, the RFID tag 250 is optionally configured such that at least part or all of the tag 250 is located or locatable underneath or within a grip or handle of the club. In this way, the look, response and feel of the club can be maintained, which is often important. This can, for example, take the form of sizing the tag 250 to fit inside the top of a handle of a golf club handle, e.g. by suitably dimensioning the tag, and forming the tag with a resiliently deformable outer layer, which may comprise a suitable polymeric material, and provide the tag with ridges along at least part of a lateral surface of the tag for engaging and gripping the inside of the golf club handle, as shown in FIG. 3. The tag can then be covered or partially covered with grip or handle tape, as in a conventional club.

Figure 4:
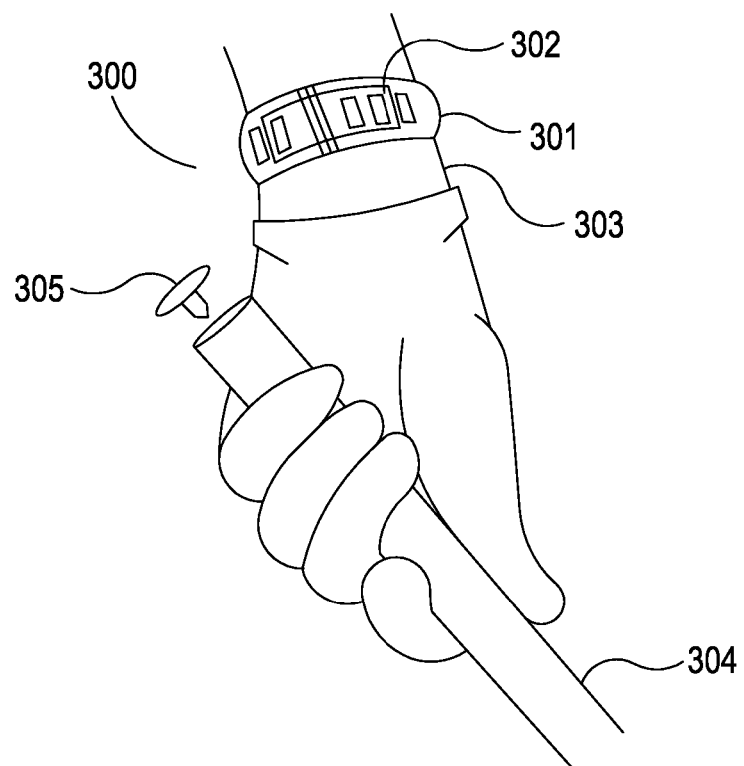
FIG. 4 illustrates a system for automatically gathering information on the performance of a golfer, comprising a portable device such as those shown in FIG. 1 or FIG. 2.

FIG. 4 shows a golf monitoring system 300 which comprises a wearable device 301 and a tag 305. The wearable device 301 is worn around the wrist of the player 303; for a right handed golf swing the wearable device 301 will be worn on the left wrist or about the left hand of the player 303.

The wearable device 301 comprises an RFID antenna 302 located in the wrist band. This is used to communicate with the tag 305, which stores a unique identifier. The tag is screwed or otherwise affixed or attached to the top of the golf club 304.

With this arrangement, when the player 303 grips the club 304 ready to take a shot, they naturally bring the wearable device 301 into close proximity to the tag 305. The range of detection, which nominally defines a sphere within which the RFID antenna 302 can communicate with the tag 305, depends on a number of factors, and can be extended at the cost of battery life. In tests, it has been found that a range of up to 12 cm, and preferably within 9 cm, for detecting the tag 305 provides a balance between good tag detection and battery life. For example, the system can be configured to detect a tag 305 when the distance between the tag 305 and the RFID antenna 302 is in the range of 1 to 12 cm. In normal play, the distance between the RFID antenna 302 and the tag 305 will be less than this, and the device 301 will detect and identify the specific club 304 being used. In other systems, the range of detection can be extended to up to 50 cm, which may be useful if the wearable device is not worn on the wrist, for example if it is worn on a belt.

The system therefore provides a way to detect and identify a club automatically, without the need for the player or user to perform any actions other than those normally associated with playing the game. This may have the advantages that it does not break the flow of the game, and that the player or user cannot forget to tag or accidentally double tag a shot.

The wearable device 301 comprises a swing motion sensor 105, object sensors 106, 107, and other components described above to allow it to gather information on the performance of the player.

Figure 5:
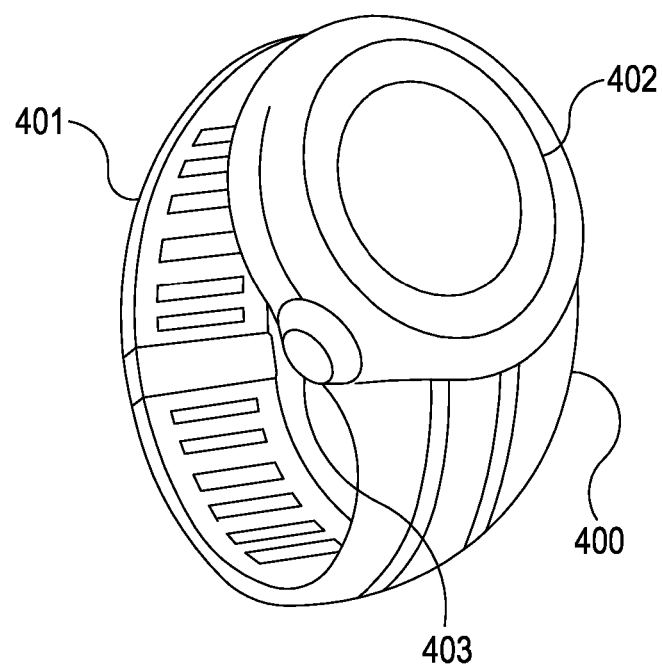
FIG. 5 shows an example of a portable device, for use in the system of FIG. 4.

FIG. 5 illustrates a wearable device 400, such as the wearable device of FIG. 4. The wearable device 400 comprises a club recognition module 111 (see FIG. 1), integrated into the wrist strap 401. In some embodiments, this may take the form of an RFID antenna integrated into the wrist strap. The club recognition module 111 communicates with the tag 305 (see FIG. 4) affixed or otherwise attached to the golf club 304 (see FIG. 4), and can thereby both detect that a club 304 is present and read or determine a unique identifier form that club 304.

The device 400 also comprises an output device in the form of a screen 402. The screen 402 is used to display status information, such as whether or not the device 400 is recording, battery life, time, and the like. The screen 402 is also used to display a summary of the gathered information, and any recent events that have been detected and/or logged.

A rotary encoder with push button 403 is also provided, which provides a user interface for the player or user. The player or user can use the rotary encoder with push button 403 to interact with the device 400, for example to scroll and select.

The device also comprises a Bluetooth module 108 (FIG. 1), microUSB port 202 (FIG. 2) (not shown) and other features as described in the summary or in relation to other figures.

Figure 6:
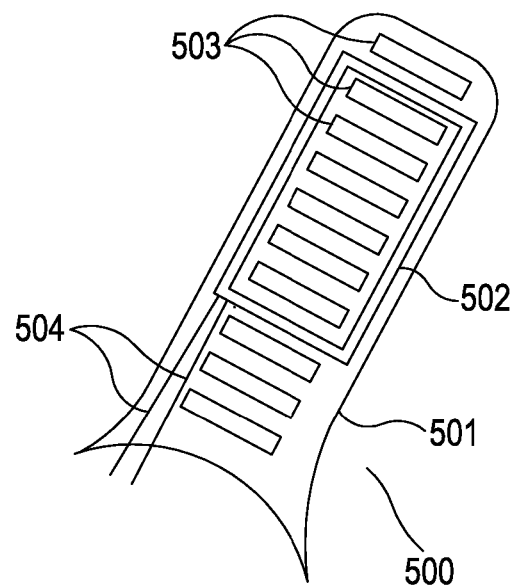
FIG. 6 shows the strap of the device of FIG. 5.

FIG. 6 depicts an example of a strap 501 of a wrist worn device 500, which in embodiments can be the device 301, 400 of FIGS. 3 and/or 4. An aerial or antenna 502 for RFID or nearfield is encased in the plastic of the wrist strap, for example sandwiched into layers of plastic. The aerial or antenna 502 is part of a tag reader and used for detecting and/or identifying pieces of equipment, for example, the golf club 304 (FIG. 3).

The aerial 502 is arranged to fit between a plurality of holes 503 in the strap, which are used to adjust the fit of the strap and to secure it in combination with a buckle (not shown). Positive and negative lines 504 from the antenna are provided to the components comprised in a face 505 of the wrist worn device 500. In some embodiments, the antenna lines 504 may connect to a tag reader, such as an RFID/nearfield module 211 (FIG. 2), or other signal processing hardware (not shown).

Figure 7:
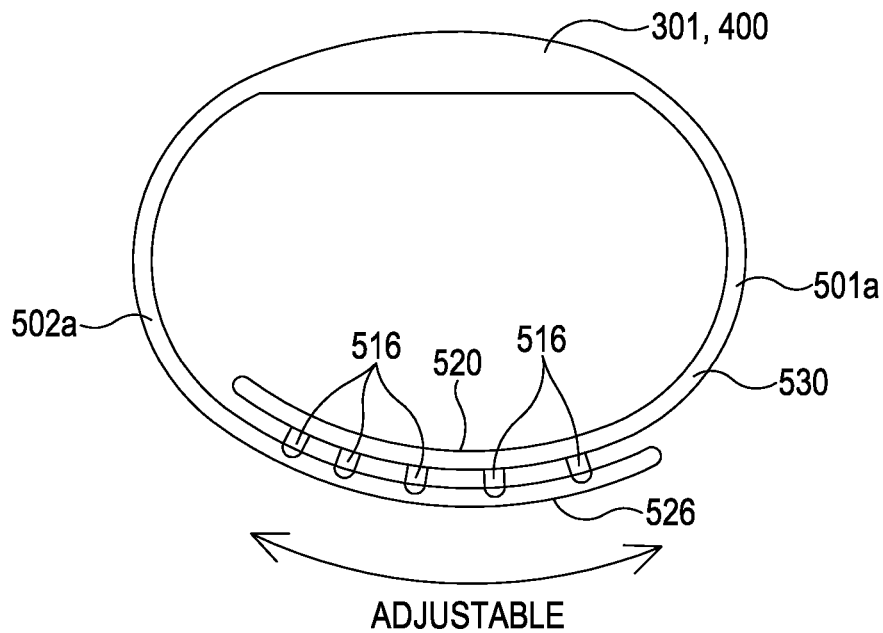
FIG. 7 shows another strap of the device of FIG. 5.

FIG. 7 shows an alternative embodiment of a strap 501a of a wrist worn device, such as the wrist worn device 301, 400 of FIGS. 4 and/or 5. The strap 501a is adjustable between a range of adjustment positions, preferably comprising a plurality of discrete adjustment positions, to adjust the circumference of the strap 501a in order to fit the user's wrist.

The device 301, 400 comprises an antenna 502a for communicating with the tags 250, 305 located in the club handles 304. The antenna 502a extends around at least part of the strap 501a. This provides a convenient antenna arrangement that can efficiently detect signals from the tags 250, 305. However, it will be appreciated that the antenna 502a will vary in effective length/circumference depending on the adjustment setting of the strap 501a to fit the wrist of the user, thereby leading to variations in the response and performance of the antenna 502a.

In order to address these issues, the device 301, 400 is provided with a compensation system 506 for compensating for the variations in the response and performance of the antenna 502a associated with the strap adjustment position/configuration. The compensation system 506 comprises a strap adjustment detection mechanism 507 for detecting an adjustment position/configuration of the strap and a compensation mechanism 508 for compensating for differences in the performance or response of the antenna 502a according to the signal obtained from the strap adjustment detection mechanism 507 that is indicative of the adjustment position/configuration of the strap 501a. The compensation mechanism 508 comprises a plurality of matching circuits 510a-e or systems, which each have a differing electrical property, such as impedance, capacitance and/or inductance.

An example of a particularly suitable matching circuit or system 510a-e comprises a capacitor/inductor matched bank filter. The compensation mechanism 508 is configured to select/provide the matching circuit or system 510a-e that corresponds with the detected fixing position of the strap 501a from the plurality of matching circuits or systems 510a-e according to the detected fixing position of the strap. In an alternative embodiment, the compensation mechanism comprises an adjustable matching circuit or system and the compensation mechanism is configured to adjust or vary the adjustable matching circuit or system dependent on the detected fixing position of the strap.

Figure 8:
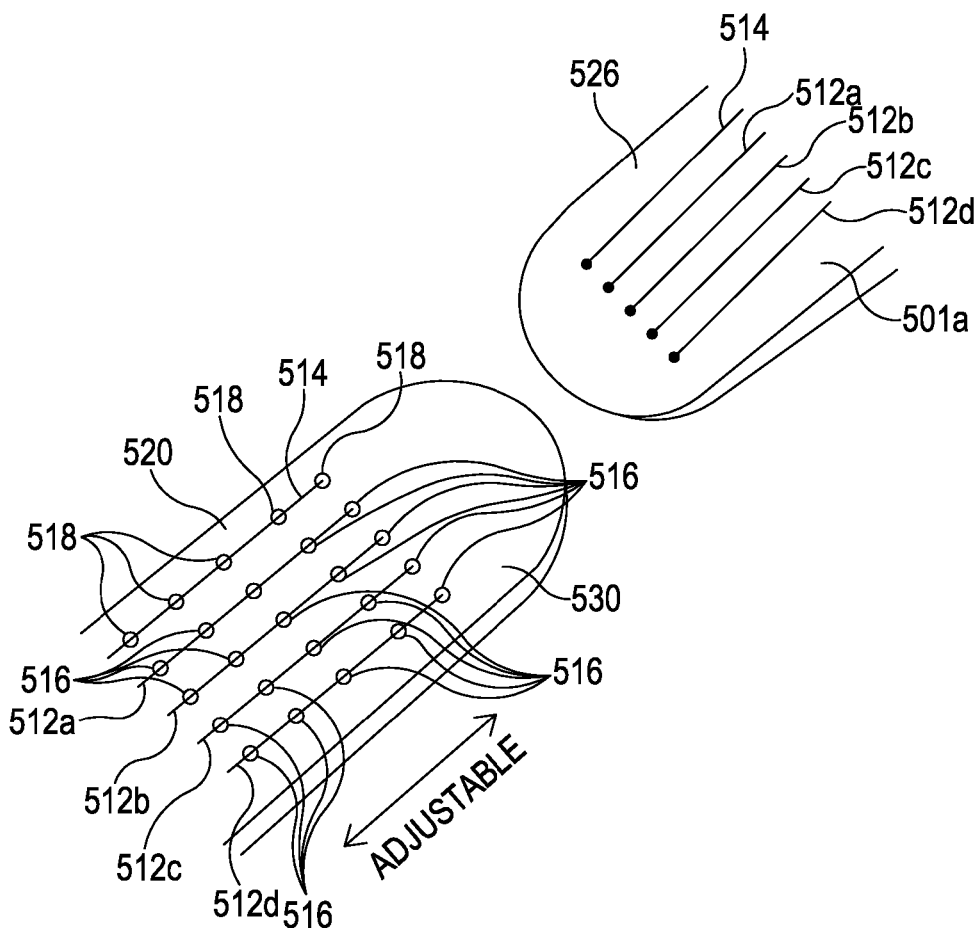
FIG. 8 shows a detail cut-away view of the strap of FIG. 7.

In particular, as shown in FIG. 8, the antenna 502a comprises a plurality of antenna conductor lines 512a-d that extend along the length of the strap 501a. The strap 501a also comprises a position detector line 514 that extends in parallel to the antenna conductor lines 512a-d. The antenna conductor lines 512a-d and the position detector line 514 are formed as part of a flexible printed circuit board (PCB) that is provided in the strap 501a.

Each antenna conductor line 512a-d and the position detector line 512 comprises one or more first contacts 516, 518 (in this example five first contacts per antenna conductor line 512a-d and position detector line 514). The one or more first contacts 516, 518 are provided on a first part 520 or end of the strap 501a. If more than one first contact 516, 518 per antenna conductor or position line 512a-e, 514 is provided, then the first contacts 516, 518 for a given antenna conductor line 512a-d or position detector line 514 are distributed in a longitudinal direction of the first part 520 or end of the strap 501a. The first contacts 516, 518 are provided as surface mount pads on the flexible PCB.

Each antenna conductor line 512a-d and the position detector line 514 also comprises one or more second contacts 522, 524 (in this example only one second contact per antenna conductor line 512a-d and position detector line 514). The second contacts 522, 524 are provided on a second part 526 or end of the strap 501a, opposite the first part 520 or end. If more than one second contact 522, 524 is provided, then the second contacts 522, 524 for a given antenna conductor line 512a-d or position detector line 514 are distributed in a longitudinal direction of the second part 526 or end of the strap 501a. The second contacts 522, 524 are provided as surface mount pads on the flexible PCB.

Figure 9:
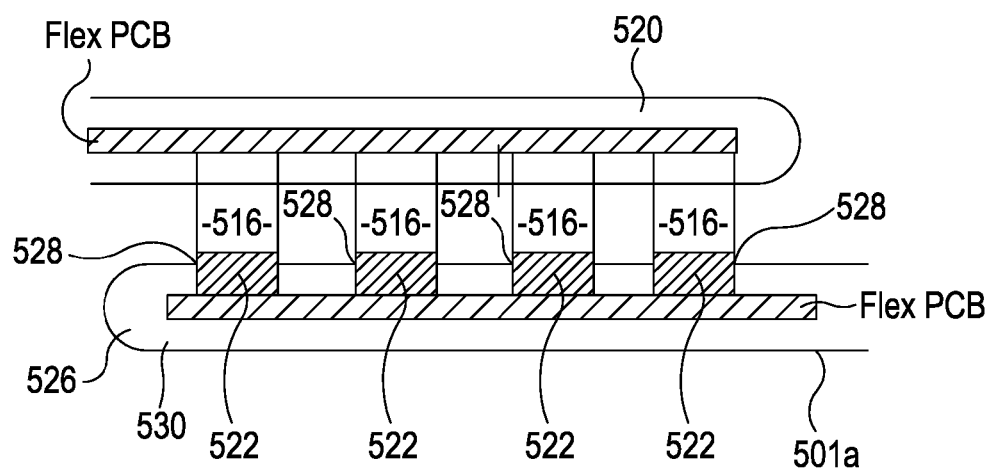
FIG. 9 shows the cross sectional view of part of strap of FIG. 7.

As shown in FIG. 9, the first contacts 516, 518 are male contacts that project from the strap 501a whilst the second contacts 522, 524 are female contacts that are recessed in recesses 528 in an electrically insulating, resiliently deformable strap body 530. In this way, one or more of the first contacts 516, 518 can be inserted into the recesses 528 to contact the corresponding second contacts 522, 524. In addition, the first contacts 516, 518 and the recesses 528 are sized such that the portions of the strap body 530 surrounding the recesses 528 are slightly resiliently deformed by the first contacts 516, 518 so that the first contacts 516, 518 can be fixed or push fit in position in contact with the corresponding second contacts 522, 524 and also to thereby secure the strap 501a together with a desired circumference, e.g. to fit the wrist of the user.

It will be appreciated that the combinations of first 516, 518 and second 522, 524 contacts that contact each other when the strap 501a is secured or fixed will vary depending on the adjustment position/configuration of the strap 501a. In this way, since there is contact between the one or more first 518 and second 524 contacts longitudinally distributed on the position detection line 514 when the strap 501a is closed or secured, an electrical property, such as resistance, of the position detection line 514 will vary depending on the adjustment position, circumference, configuration or length of the strap 501a.

The strap adjustment detection mechanism 507 comprises a strap sensor (not shown) that is configured to measure the electrical property of the position detection line 514 and thereby determine the adjustment position, circumference, configuration or length of the strap 501a or data indicative thereof. The adjustment position, circumference, configuration or length of the strap 501a or data indicative thereof is provided to a processor 532 for use in selecting the appropriate compensation required for the antenna 502a configuration associated with the measured adjustment position, circumference, configuration or length of the strap 501a.

Figure 10:
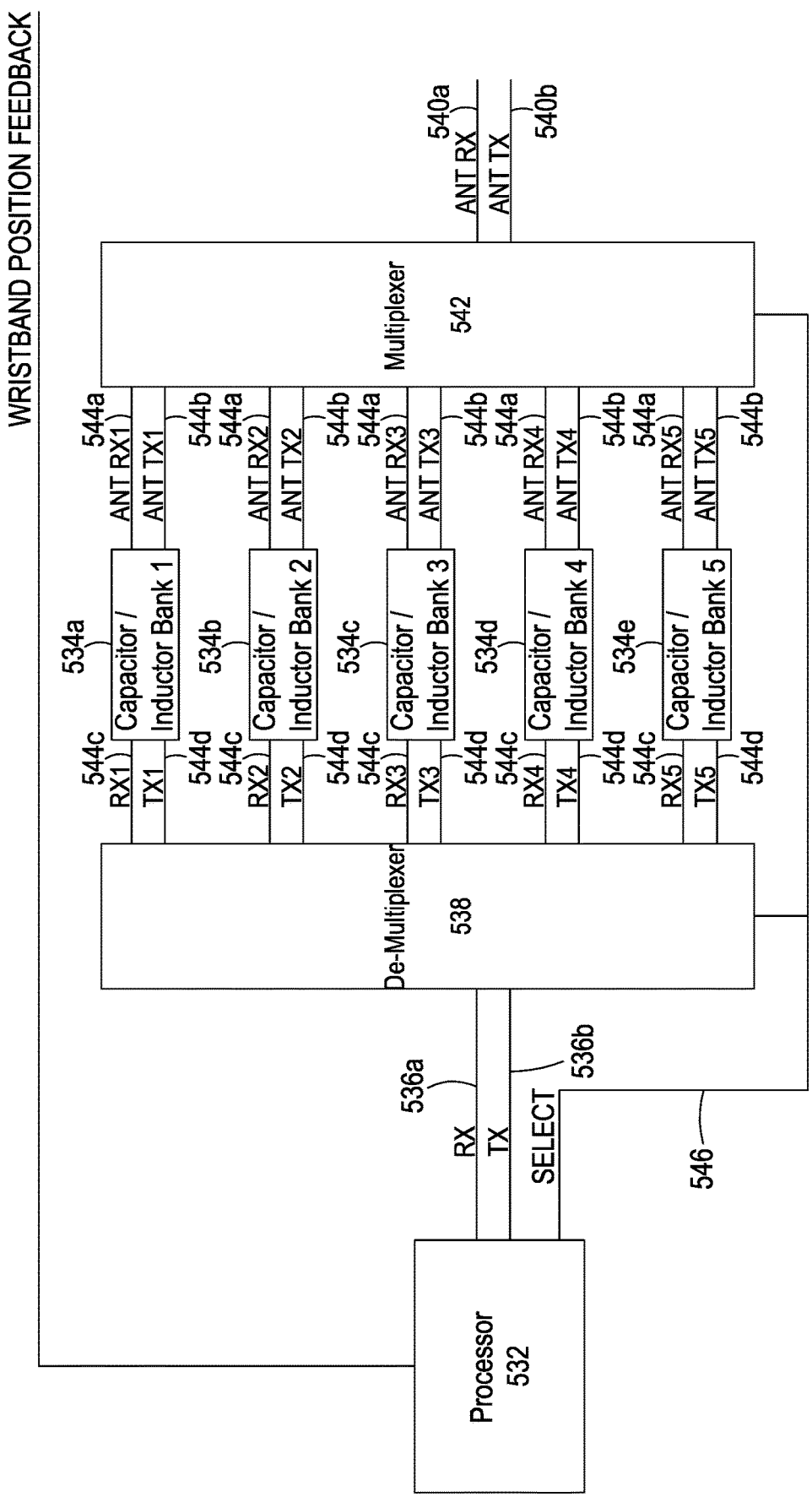
FIG. 10 illustrates a compensation mechanism for use with the strap of FIG. 7.

As indicated above, the compensation mechanism 508 comprises the plurality of matching circuits or systems, which in this example comprise capacitor/inductor matched bank filters 534a-e, as shown in FIG. 10. Each capacitor/inductor matched bank filter 534a-e corresponds to, and provides appropriate electrical properties for matching the properties/response of the antenna for, a different adjustment position, circumference, configuration or length of the strap 501a. In this example, there are five possible discrete adjustment positions, circumferences, configurations or lengths of the strap 501a, corresponding to combinations of the five sets of first contacts 516, 518 and the single set of second contacts 522, 524. As such, five matched bank filters 534a-e are provided, each corresponding to one of the discrete adjustment positions, circumferences, configurations or lengths of the strap 501a. However, it will be appreciated that other numbers and/or combinations of adjustment positions, circumferences, configurations or lengths of the strap 501a and/or matched bank filters 534a-e may be provided.

Talk and receive lines 536a,b from the processor 532 are connected to the plurality of matched bank filters 534a-e via a de-multiplexer 538. The plurality of matched bank filters 534a-e are also connected to antenna talk/receive lines 540a,b via a multiplexer 542. Each matched bank filter 534a-e is connected to the multiplexer 542 and de-multiplexer 538 via corresponding talk and receive lines 544a-d. The processor 532 is connected to the multiplexer 542 and de-multiplexer 538 via a select line 546 and is configured to operate the multiplexer 542/de-multiplexer 538 to selectively choose one of the matched bank filters 534a-e that is associated with the determined adjustment position, circumference, configuration or length of the strap 501a or data indicative thereof that is received from the strap adjustment detection mechanism 507 by the processor 532.

Figure 11A:
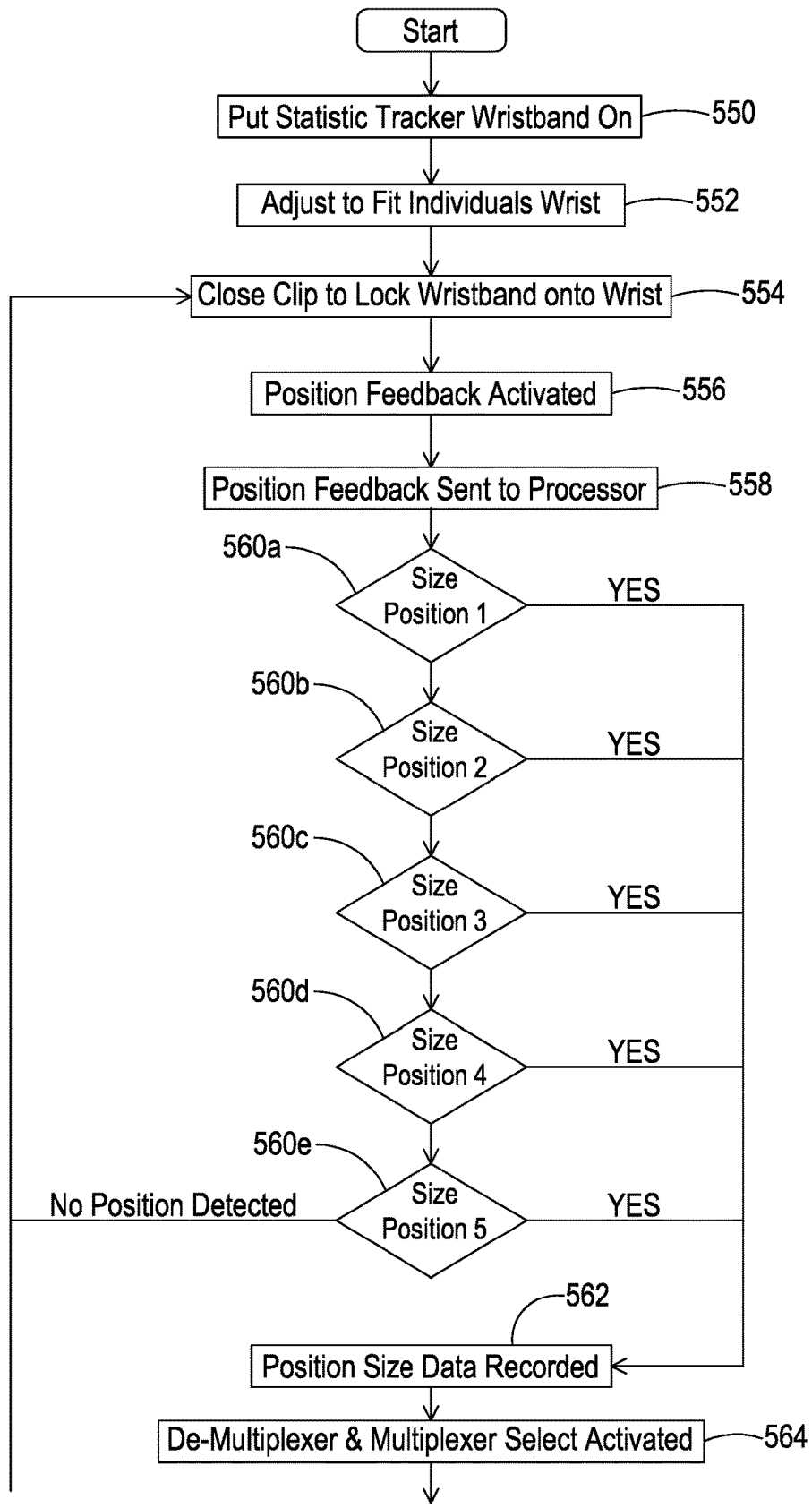
FIGS. 11a and 11b show flowcharts of a method for operating the compensation mechanism of FIG. 10.
Figure 11B:
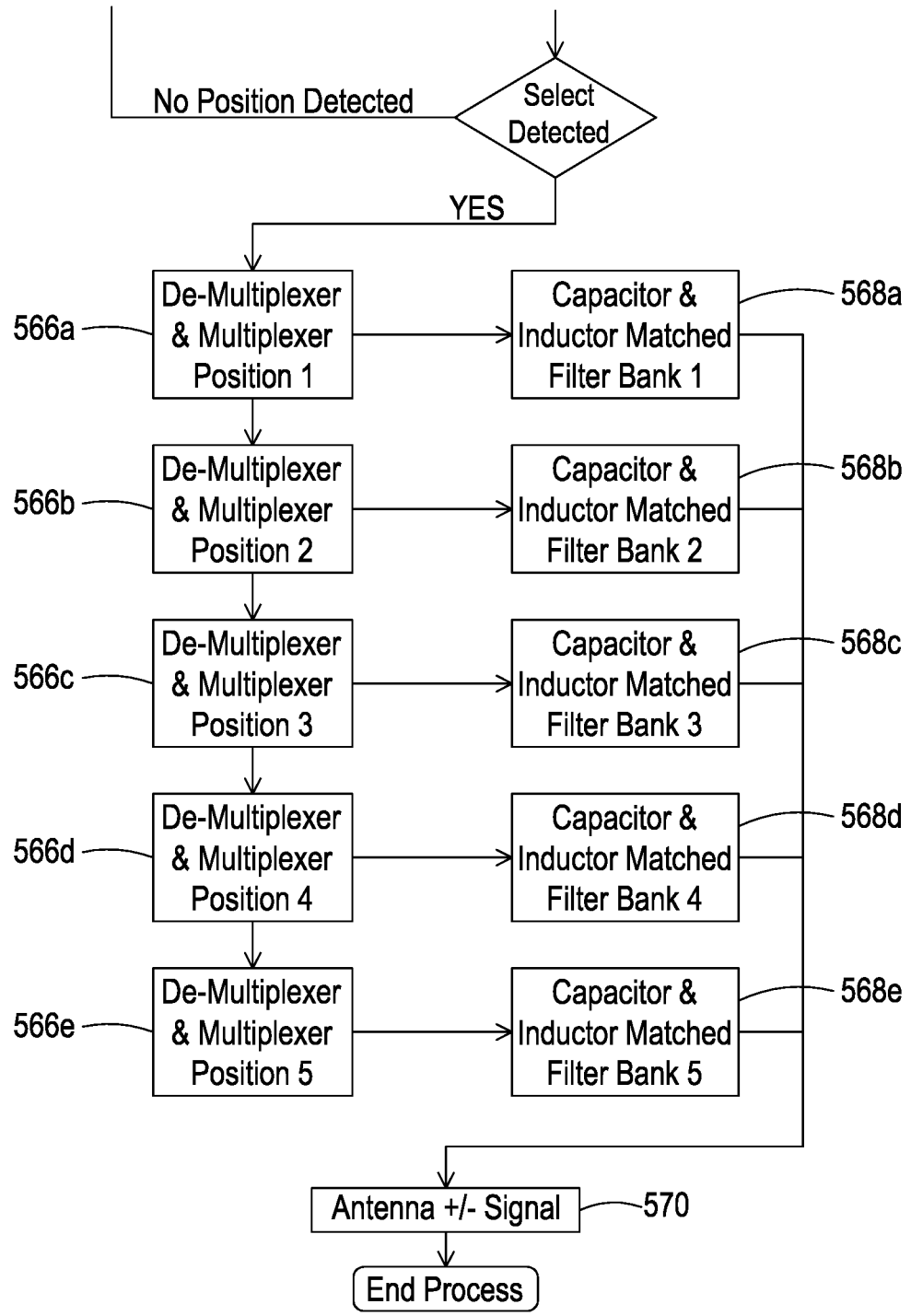
Figure 12A:
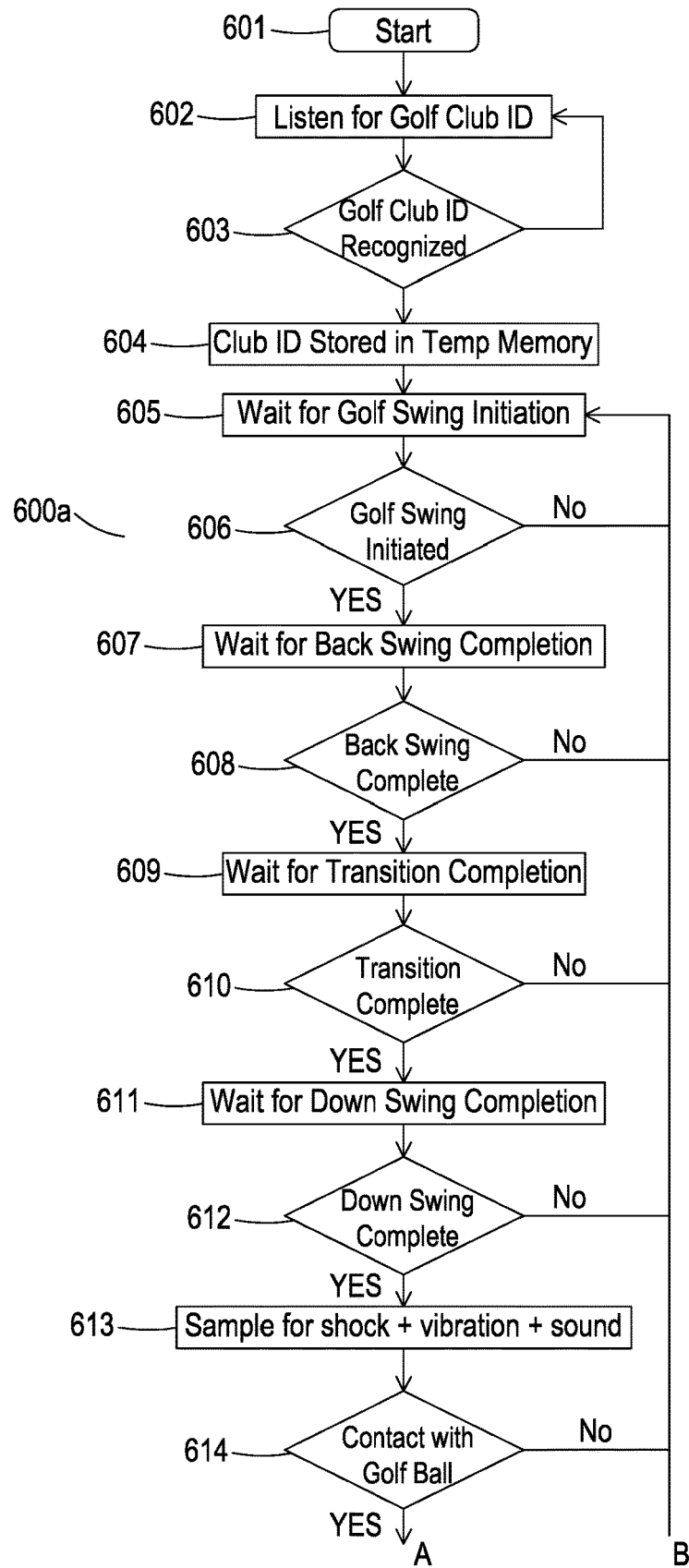
FIG. 12 is a flowchart of a method for using the system of FIG. 4.
Figure 12B:
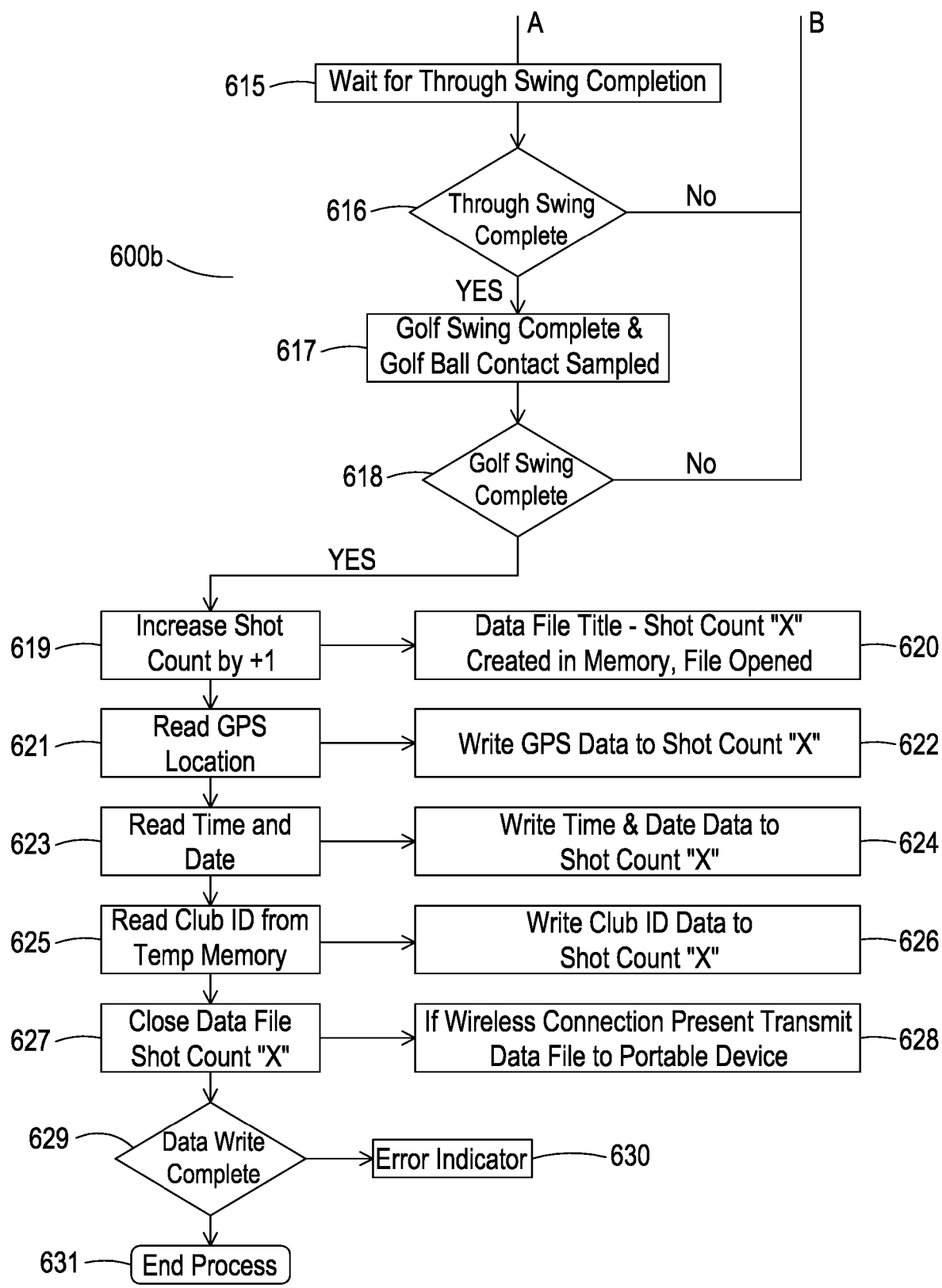

The operation of the compensation system 508 is illustrated in FIGS. 11(a) and 11(b). In step 550, the user puts the device 301, 400 on and adjusts the strap 501a to fit their wrist in step 552 by placing the first (male) contacts 516, 518 in the recesses 528 of appropriate second (female) contacts 522, 524. Once a suitable strap size/configuration has been selected by the user, the user closes a clip to lock the strap 501a to the user's wrist in step 554. Thereafter, position feedback is activated and the strap sensor measures electrical properties (e.g. resistance or impedance) of the position detection line 514 in step 556. Since the female second contacts 522, 524 contacted by the male contacts 516, 518 will vary depending on the strap 501a size/configuration, the electrical property of the position detection line 514 measured by the strap sensor will reflect the strap 501a size/configuration. The signal from the strap sensor is sent to the processor 532 in step 558. The processor 532 determines which size position is reflected in the signal from the strap sensor in steps 560*a-e*, e.g. by comparison with a look up table or the like. If the signal from the strap sensor cannot be matched to a strap size/configuration, then the position feedback is deactivated and the process loops back to the start. Once the strap size/configuration has been determined, the data is recorded in a memory in step 562 and the processor signals the multiplexer 542 and de-multiplexer 538 on the select line 546 in step 564 by providing a select signal corresponding to the multiplexer/de-multiplexer position appropriate for the detected strap size/configuration. If the select signal does not correspond to a multiplexer/de-multiplexer position, then the process reverts to the start. If a multiplexer/de-multiplexer position is detected, then the multiplexer 542/de-multiplexer 538 selects the appropriate capacitor and inductor matched filter bank 534*a-e* in step 566*a-e*, 568*a-e* for use in providing the antenna talk and receive signals in step 570.

In this way, the compensation system 506 is configured to automatically adjust for differences in size, length, configuration or electrical and/or magnetic properties of the antenna 502*a* due to changes in adjustment position, circumference, configuration or length of the strap 501*a*. This may help to maintain a better and more constant performance level and/or sensing range of the antenna 502*a*, regardless of the adjustment position, circumference, configuration or length of the strap 501*a*.

FIG. 6 shows a method for detecting a golf swing using motion sensors and contact sensors. The process is started 601, and in steps 602 and 603 seeks a signal from the tag 305 and waits for the detection and identification of the golf club 304 (FIG. 3). This occurs when the player is holding the club 304, and may be about to take a swing. Once a golf club ID has been recognised, that club ID is stored in memory in step 604.

In steps 605 and 606, the method monitors for motions which indicate a golf swing is being initiated, using the swing motion sensor 105 (FIG. 1) by comparing readings against predetermined patterns or parameter ranges. The predetermined patterns or parameter ranges are determined from analysis and segmentation of data from swing trials for a particular type of swing, for example as shown in FIG. 13. When the method detects that a swing has been initiated, it begins to look for motions which indicate that a back swing is in progress. Step 607 waits for sensor readings which indicate that a back swing is complete, in a predetermined time window. If the time window elapses without the detection of back swing completion, the decision at 608 resets back to step 605, if back swing completion is detected in the appropriate time frame, the method progresses.

Steps 609 and 610 perform a similar action of monitoring for completion of the transition phase. Steps 611 and 612 do the same for the down swing. At this point, contact with the ball is to be expected if the swing is a real swing, as opposed to a practice swing. Step 613 samples for both sound and shock and/or vibration, looking for sensor readings which indicate that contact with the ball has occurred. For example, if the ball has been hit during a drive, a significant decrease in speed can be expected, and this produces a measurable shock, in addition to characteristic vibrations caused by the impact, which can be detected using the shock and vibration sensor 106 (FIG. 1). In some cases, the decrease in speed can be up to 25%, and in other cases even higher. The characteristics of the vibrations caused by the impact may provide information, for example on the quality of the shot. In addition to the shock and vibrations, such a hit will also produce sounds which are measurable using the sound sensor 107 (FIG. 1).

Various methods of analysis are possible for detecting the sounds and/or shock and vibrations caused by contact with the ball, for example, the method may comprise using one or more of: matched filtering or other FIR filtering, frequency spectrum analysis, filtering (e.g. band pass filtering, optionally with subsequent downsampling), and thresholding. The method can also comprise the use of noise rejection techniques, for example adaptive filtering, to remove background noise. Specific implementations of these and/or equivalent techniques will be apparent to one skilled in the art.

In this example, decision 614 resets the process if no contact is detected. In other examples, the method may continue, but log that the swing was a practice swing, or may assign and/or log a probability that contact occurred.

Steps 615 and 616 monitor for the through swing, and steps 617 and 618 check for completion of the swing.

Upon successful exiting of step 618, the method stores the relevant information for the swing, including the time and location information as well as the shot count and club identifier. The current shot count is incremented in step 619, and a data file is created and opened for the shot in step 620. The GPS location, time and date, and club ID are read in steps 621, 623 and 625 respectively, and this data is written to the newly opened data file in corresponding steps 622, 624 and 626. The data file is then closed in step 627. In other embodiments, the stored information may include sensor readings from the swing motion sensor 105, shock and vibration sensor 106 and/or sound sensor 107 (see FIG. 1), or data derived therefrom.

Step 628 ensures that if a wireless, e.g. Bluetooth, connection is present, the data file should be transmitted through that data connection, for example to a consumer device.

Step 629 checks that the data write executed successfully, initiating an error handler or indicator 630 if it did not. The process then ends 631, and in use will loop back to step 601 to wait for another swing.

The individual phases of a golf shot, for example a drive, are illustrated in FIG. 13, along with indications of the motions which are important for each phase. In most of the subfigures there is shown a player 700, a club 701, and a ball 702. The same numbering is used throughout the subfigures. References to movements are given for the left wrist of the golfer in this example. The x-axis is substantially horizontal, and the y-axis is substantially vertical. The z-axis is also utilised for motion detection. Although changes occurring along the z-axis are not explicitly described herein, they will be apparent from the diagrams, as well as from analysis of swing data. Similarly, three dimensional gyroscopic data is used for motion detection. The patterns of readings which describe swing phases can be determined from analysis of exemplary swings.

Figure 13A:
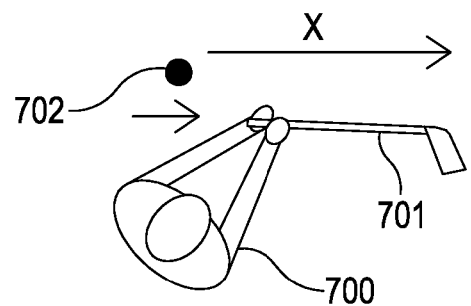
FIG. 13a-k illustrates a series of stages which nominally describe a golf swing

FIG. 13*a* shows the initiation of the back swing. The player 700 lifts the club 701 and a large change along the x-axis is observed.

Figure 13B:
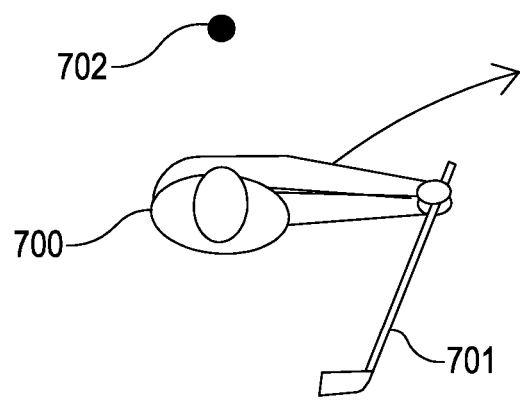

FIG. 13*b* shows the back swing in progress. The left arm is lifting and there is a large change in along the y-axis as the arm lifts towards the sky. There is also further change along the x-axis.

Figure 13C:
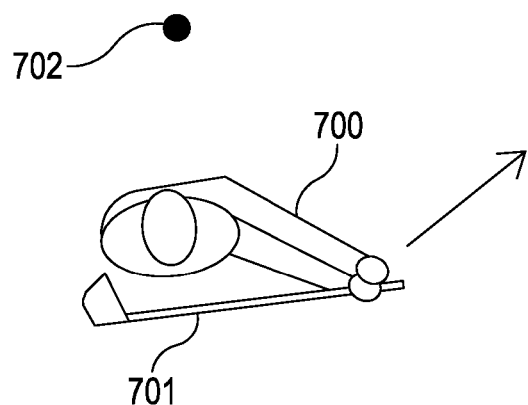

FIG. 13*c* shows the transition phase at the top of the back swing, where a change in direction occurs. A significant acceleration should be observable.

Figure 13D:
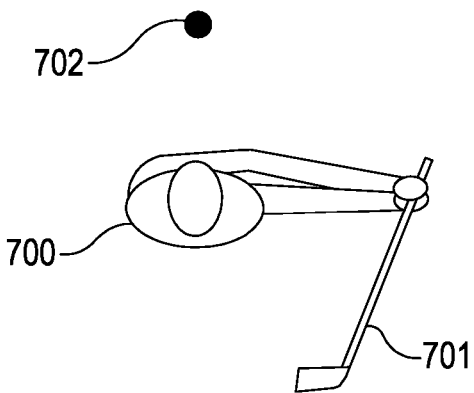
Figure 13E:
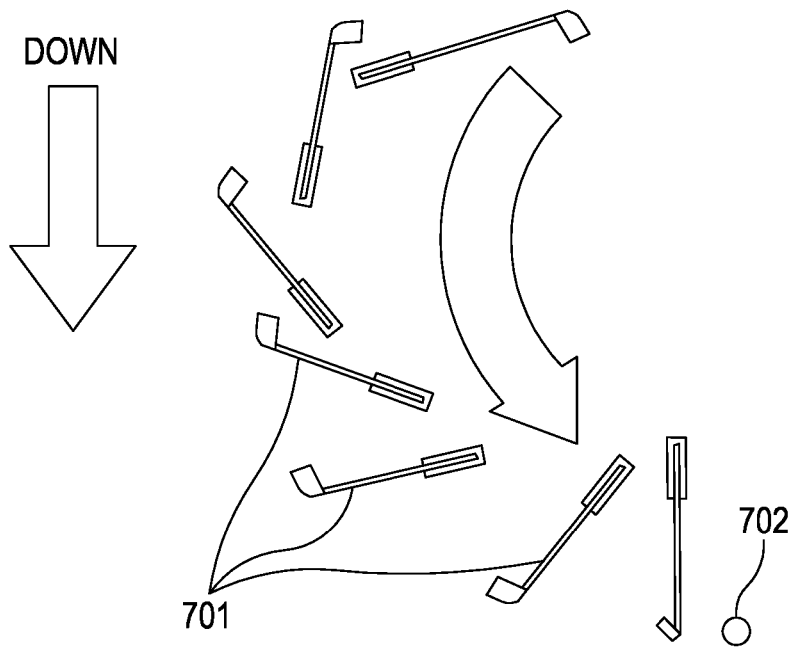

FIGS. 13*d* and 13*e* show the down swing. The club 701 is brought rapidly down towards the ground, and there is a large change along the y-axis. A large acceleration will occur.

Figure 13F:
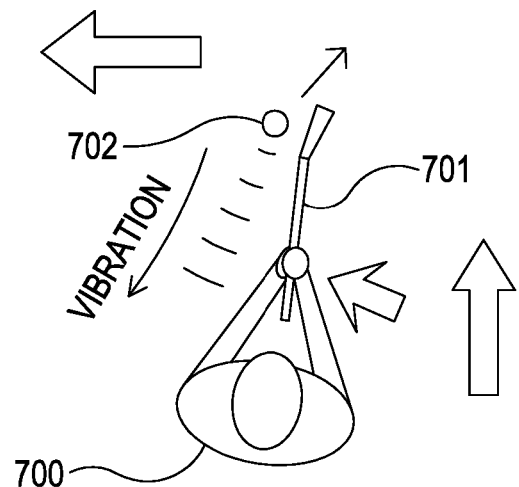

FIG. 13*f* shows contact with the ball, wherein a strong force in both x and y directions occurs. The contact with the ball generates shock/vibrations, as well as acoustic waves. Research shows that in some cases a speed reduction of up to 25% occurs due to the contact, although this figure can be even higher depending on the golfer, swing type and conditions. In other cases, the speed reduction can be significantly lower.

Figure 13G:
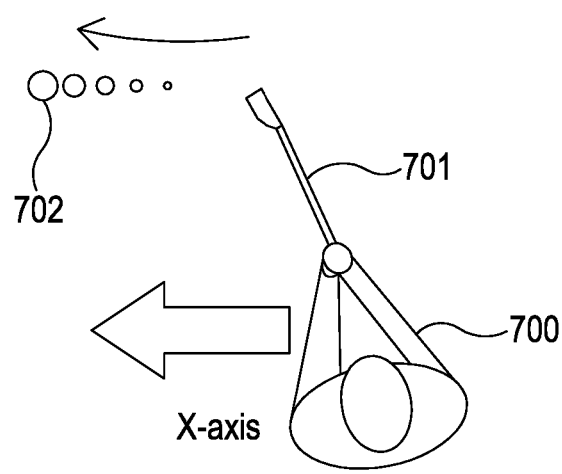
Figure 13H:
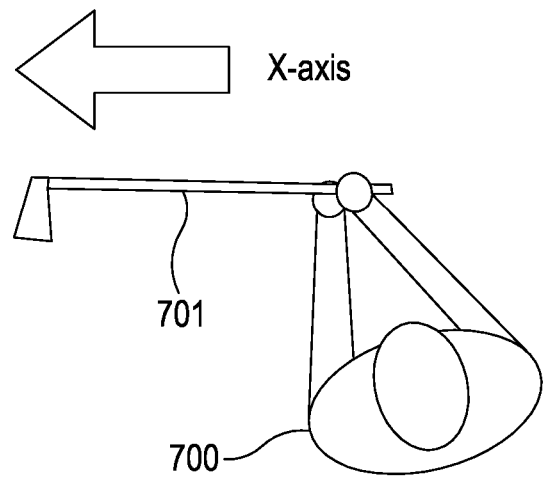

FIGS. 13*g* and 13*h* show the through swing. The club will have lost speed due to the impact, and continues to slow down. Movement in the x-axis indicates the follow through is occurring.

Figure 13I:
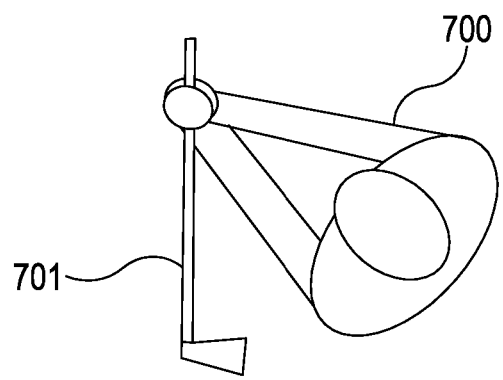
Figure 13J:
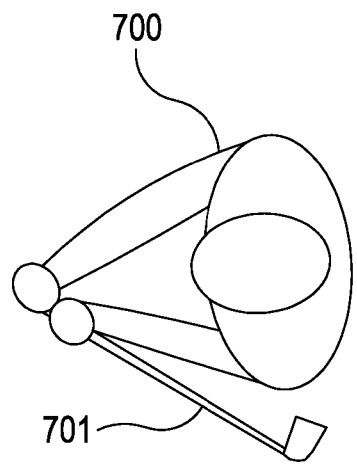
Figure 13K:
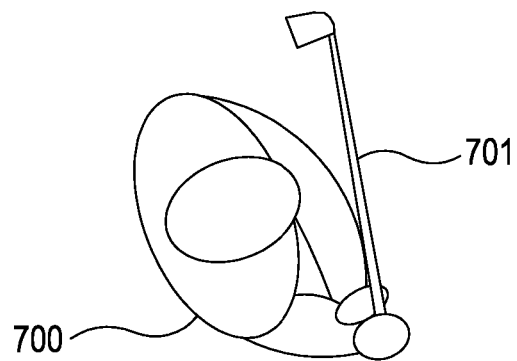

FIGS. 13*i*, 13*j* and 13*k* show the completion of the swing. The club continues to slow, whilst movement occurs upwards along the y-axis. The maximum y-value will be reached as the club 701 reaches the top of the follow through. Finally, there is usually a pause, wherein little motion occurs.

It will be appreciated that each of the above swing stages comprises an indicative motion, pattern, or range of motions which is identifiable using the readings from the swing motion sensor 105, shock and vibration sensor 106, and/or sound sensor 107 (see FIG. 1). For example, inertial forces and/or acceleration due to gravity can be measured by the swing motion sensor 105, and patterns, or ranges of patterns, of these readings for each stage of the swing motion can be ascertained from analysis of exemplary swings. These patterns or ranges can then be used in the detection of each of the relevant swing stages. In use, the system or method (for example the system shown in FIG. 4) may be supplied with such patterns or ranges of patterns preloaded and/or may be able to calibrate such patterns from swings taken by the player or user.

While certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

For example, although various specific examples are given relating to a golf monitoring system, it will be appreciated that information may be gathered on other actions, for example tennis, baseball, badminton, squash or football.

In addition, although the wearable devices shown are configured to be worn on the wrist or forearm of a player or user, it will be appreciated that the devices could also be comprised in a glove to be worn on a hand of the user. Similarly, for other sports such as football it may be advantageous to have ankle, leg or foot mounted devices or indeed, any limb mounted device may be applicable, depending on the sport, motion or application. In some instances, the device could be wearable somewhere other than a limb, e.g. on a belt or in a pocket. Whilst the systems have primarily been described relating to a single wearable device, two or more devices can be used, for example one on each ankle or one on each wrist, and this may improve performance.

Although embodiments describe advantageous use of both the shock and vibration sensor 106 (FIG. 1) and the sound sensor 107 (FIG. 1) to determine when a ball is hit, it will be appreciated that it could be possible to detect striking of the ball using either the shock and vibration sensor 106, the sound sensor 107, and/or other sensors, either alone or in combination.

Specific swing motion stages are described by way of example, but only some and/or alternative swing motion stages could be identified. Swing motion stages may be specific for an identified club type, e.g. driver, putter, wedge etc. Swing motion stages may be specific for a swing type, e.g. drive, approach, chip, putt etc.

The invention claimed is:

1. A system for automatically gathering information on a performance of a sports action involving an object being hit or struck, the system comprising:
   one or more tags configured to be coupled on a piece of sports equipment, wherein the one or more tags comprise at least one Radio Frequency Identification (RFID) or Near Field Communication (NFC) tag, and
   a wearable device comprising:
      a strap,
      one or more swing sensors and at least one object contact sensor, the one or more swing sensors and the at least one object contact sensor being provided on the at least one wearable device, the at least one object contact sensor being configured to detect a contact with the object, the wearable device being configured to activate the at least one object contact sensor due to or responsive to detected swing motion readings from the one or more swing sensors, and
      a tag reader provided in and extending along or around the strap, wherein the tag reader comprises an antenna, the antenna being formed as part of a flexible printed circuit board (PCB), and the tag reader having a range of detection of at least 9 cm, wherein the antenna extends longitudinally along the strap such that when a user wears the at least one wearable device and holds the piece of sports equipment, the antenna is located at an underside of a wrist of the user to communicate with the one or more tags spaced apart from the antenna, the tag reader comprising a Radio Frequency Identification (RFID) or Near Field Communication (NFC) tag reader,
   wherein the antenna is comprised in or around a strap of the wearable device,
   the strap is adjustable to vary an adjustment position, circumference, configuration or length of the strap,
   the system comprises a strap sensor that is configured to determine the adjustment position, circumference, configuration or length of the strap or data indicative thereof and the system is configured to adjust at least one operating parameter of, or compensation for, the antenna based on the determined adjustment position, circumference, configuration or size of the strap or the data indicative thereof, and
   the system comprises a plurality of antenna matching circuits or systems, and/or an adjustable matching circuit or system, wherein the system is configured to adjust at least one operating parameter of, or compensation for, the antenna by selecting and/or varying one or more of the matching circuits or systems based on the determined adjustment position, circumference, configuration or length of the strap or data indicative thereof.

2. The system according to claim 1, wherein one or more of the at least one object contact sensors comprises a shock and/or vibration sensor, and/or one or more of the at least one object contact sensors comprises a sound sensor; and wherein the system is configured to at least partially detect shock and/or vibrations caused by contact with the object using the one or more shock and/or vibration sensors and/or at least partially detect sound generated by contact with the object using the one or more sound sensors to thereby detect contact with the object, wherein the system is a system for automatically gathering information on a performance of an action performed by a player or user in a sport and/or on performance of a golf swing in which the object being struck is a golf ball being hit or struck by a golf club and the at least one object contact sensor is configured to detect contact between the golf club and golf ball.

3. The system according to claim 1, wherein the wearable device is configured to be worn on a wrist of the upper hand of a player or user.

4. The system according to claim 1, wherein the system comprises or is configured to communicate with the one or more tags, applied, affixed, affixable or mountable to the piece of equipment or golf club, the system being adapted to automatically detect when the piece of sports equipment or golf club is being used, to hit or strike the object, and/or which piece or what type of equipment or golf club is being used, to hit or strike the object, and wherein the at least one tag is attachable to a part of the sports equipment that is adjacent, proximate or gripped by a player or user.

5. The system according to claim 4, wherein each tag comprises, encodes or transmits an identifier and the system is configured to determine which piece or what type of equipment or golf club is being used based on the identifier.

6. The system according to claim 4, wherein the at least one tag is configured to screw into or otherwise attach to the top of a handle or grip of the piece of sports equipment or golf club or be located or locatable at least partly inside the handle or grip of the piece of sports equipment or golf club and/or the tag is configured such that at least part or all of the tag is located or locatable underneath or within a grip or handle of the piece of sports equipment or golf club, wherein the system comprises or is configured to communicate with a tag reader for reading the tags, and the tag reader is comprised in or mounted or mountable on the at least one wearable, device, and wherein the system is configured to determine proximity between the tag and tag reader and determine when a piece of sports equipment or golf club is being held when the at least one tag on the piece of equipment is adjacent or proximate to all or part of the tag reader.

7. The system according to claim 6, wherein all or part of the tag reader is located or locatable on the underside of a wrist of the player or user.

8. The system according to claim 1, wherein the one or more swing sensors comprise one or more inertial sensors, wherein:

the one or more swing sensor comprises or is comprised in one or more shock and/or vibration sensors, the system is configured to monitor for a prescribed swing motion using the at least one swing sensor, the system is configured to activate the at least one object contact sensor for a period of time during a swing motion and/or the system is configured to activate the at least one swing sensor due to a piece of equipment being detected, the system comprising a swing detector that comprises or communicates with the at least one swing sensor and is configured to detect swing motions, wherein further: the swing detector is configured to monitor the at least one swing sensor for predefined motion ranges in a predefined order and/or in predefined time windows, the swing detector is configured with one or more patterns of movements which nominally describe a swing, and monitors the at least one swing sensor to detect such motions or patterns, the patterns are or comprise ranges or patterns in the spatial and/or temporal domains, the swing detector is configured to monitor the at least one swing sensor for readings within a defined range indicative of a motion occurring, and then monitor for another motion indicative of a next stage of a swing, and wherein the piece of sports equipment is a golf club and/or the swing detector is configured to detect a golf swing.

9. The system according to claim 1, wherein the system is configured to collect one or more of: location data, time data, equipment type and/or ID data, swing data derived from readings from the at least one swing sensor and/or the at least one object contact sensor, swing type data derived from the at least one swing sensor, the at least one object contact sensor and/or internal variables of the at least one portable device, shot count, and/or internal variables from the at least one portable device, wherein the system is configured to differentiate between practice swings and real swings or shots, wherein contact with the object occurs in a real swing or shot, by using the one or more object contact sensors to determine whether or not contact with the object occurs during a swing, and the system is configured to use the location information from a cluster of swings in order to determine the final location of a real swing, wherein the cluster of swings are clustered in the time and/or spatial domains, and the cluster of swings comprise a real swing and one or more practice swings.

10. The system according to claim 1, wherein the system comprises one or more user interfaces, arranged so as to allow a user or player to log a shot and/or receive clarification from the player or user if a shot did or did not take place, wherein:

the system is configured to communicate with one or more remote servers through the at least one communication interface to thereby send gathered information, additional information, internal variables from the at least one portable device, and/or data derived therefrom and/or receive the maps or other location specific information, the system is configured to analyse or allow analysis of the gathered information, in order to produce statistical data, and the system is configured to determine when a real swing shot is performed or played and to automatically update a scorecard accordingly.

11. The system according to claim 1, wherein the one or more swing sensors comprise one or more inertial sensors;

the system being configured to detect swing motions based at least in part on the data received from the one or more swing sensors; wherein a swing detector is configured to monitor the at least one swing sensor for predefined motion ranges in a predefined order and/or in predefined time windows; and the swing detector is configured with one or more patterns of movements which nominally describe a swing, and monitors the at least one swing sensor to detect such motions or patterns in order to identify performance or characteristics of a swing.

12. The system according to claim 1, the tag reader being configured to communicate with one or more tags applied, affixed, affixable or mountable to the object, piece of equipment or golf club, wherein each tag comprises, encodes or transmits an identifier and the system is configured to determine which piece or what type of object, equipment or golf club is being used based on the identifier.

13. The system according to claim 1, wherein the wearable device the at least one object contact sensor comprises one or more of: shock and/or vibration sensors, inertial sensors, acoustic sensors, one or more accelerometers, one or more gyroscopes and/or one or more sound sensors.

14. The system according to claim 1, wherein the wearable device comprises
a location sensor, such as a GPS location device.

15. The system according to claim 1, wherein the at least one wearable device comprises an output device, and the output device is positioned on or along a top of the wrist of the user when the user wears the at least one wearable device.

16. The system of claim 1, wherein first and second ends of the antenna are provided at respective first and second ends of the strap and overlap with one another when the wearable device is worn.

17. The system of claim 16, wherein the tag reader has a range of detection of at least about 12 cm.

18. The system of claim 16, wherein the one or more tags are configured to communicate with the tag reader when the piece of equipment is a golf club held by a user's hand and the one or more tags are spaced apart from the tag reader.

19. The of claim 1, wherein the antenna is arranged between a plurality of adjustment holes in the strap.

20. A system for automatically gathering information on a performance of an action involving an object being hit or struck, the system comprising:
one or more tags configured to be coupled on the piece of equipment;
at least one wearable device comprising a strap;
at least one object contact sensor on the at least one wearable device and configured to detect a contact with an object; and
a tag reader provided in or extending along or around the strap,
wherein
the system comprises or is configured to communicate with the one or more tags, applied, affixed, affixable or mountable to the piece of equipment or gulf club,
the system being adapted to automatically detect when the piece of equipment or golf club is being used, to hit or strike the object, and/or which piece or what type of equipment or golf club is being used, to hit or strike the object,
the at least one tag is attachable to a part of the equipment that is adjacent, proximate or gripped by a player or user,
the at least one tag is configured to screw into or otherwise attach to the top of a handle or grip of the piece of equipment or golf club or be located or locatable at least partly inside the handle or grip of the piece of equipment or golf club and/or the tag is configured such that at least part or all of the tag is located or locatable underneath or within a grip or handle of the piece of equipment or golf club,
the system comprises or is configured to communicate with a tag reader for reading the tags, and the tag reader is comprised in or mounted or mountable on the at least one wearable, portable device,
the system is configured to determine proximity between the tag and tag reader and determine when a piece of equipment or golf club is being held when the at least one tag on the piece of equipment is adjacent or proximate to all or part of the tag reader,
all or part of the tag reader is located or locatable on the underside of a wrist of the player or user,
the tag reader comprises an antenna, and optionally at least part or a whole of the antenna is configured to be situated on the underside of a wrist of the player,
wherein the antenna is comprised in or around a strap of the wearable device,
the strap is adjustable to vary an adjustment position, circumference, configuration or length of the strap,
the system comprises a strap sensor that is configured to determine the adjustment position, circumference, configuration or length of the strap or data indicative thereof and the system is configured to adjust at least one operating parameter of, or compensation for, the antenna based on the determined adjustment position, circumference, configuration or size of the strap or the data indicative thereof,
the system comprises a plurality of antenna matching circuits or systems, and/or an adjustable matching circuit or system, wherein the system is configured to adjust at least one operating parameter of, or compensation for, the antenna by selecting and/or varying one or more of the matching circuits or systems based on the determined adjustment position, circumference, configuration or length of the strap or data indicative thereof, and
the strap sensor comprises or is in communication with one or more first contacts on a first end or part of the strap and one or more second contacts on a second end or part of the strap, wherein one or more of the first contacts contact or are selectively contactable with one or more of the second contacts when the strap is closed or secured and the one or more first and second contacts are linked by a conductor configured to allow a measurement circuit to be completed by contact between the one or more first and second contacts and the system is configured to determine the adjustment position, circumference, configuration or size of the strap based on at least one electrical property of the measurement circuit measured by a strap sensor.

21. A method for automatically gathering information on a performance of an action comprising using a piece of sports equipment to strike an object, the method comprising automatically detecting when the object is hit using a system for automatically gathering information on the performance of the sports action involving the object being hit or struck, the system comprising:
one or more tags configured to be coupled on the piece of sports equipment, wherein the one or more tags comprise at least one Radio Frequency Identification (RFID) or Near Field Communication (NFC) tag, and
a wearable device comprising: a strap,
one or more swing sensors and at least one object contact sensor, the one or more swing sensors and the at least one object contact sensor being provided on the at least one wearable device, the at least one object contact sensor being configured to detect a contact with the object, the wearable device being configured to activate the at least one object contact sensor due to or responsive to detected swing motion readings from the one or more swing sensors, and a tag reader provided in and extending along or around the strap, wherein the tag reader comprises an antenna, the antenna being formed as part of a flexible printed circuit board (PCB), and the tag reader having a range of detection of at least 9 cm, wherein the antenna extends longitudinally along the strap such that when a user wears the at least one wearable device and holds the piece of sports equipment, the antenna is located at an underside of a wrist of the user to communicate with the one or more tags spaced apart from the antenna, the tag reader comprising a Radio Frequency Identification (RFID) or Near Field Communication (NFC) tag reader, wherein the antenna is comprised in or around a strap of the wearable device, the strap is adjustable to vary an adjustment position, circumference, configuration or length of the strap, the system comprises a strap sensor that is configured to determine the adjustment position, circumference, configuration or length of the strap or data indicative thereof and the system is configured to adjust at least one operating parameter of, or compensation for, the antenna based on the determined adjustment position, circumference, configuration or size of the strap or the data indicative thereof, and the system comprises a plurality of antenna matching circuits or systems, and/or an adjustable matching circuit or system, wherein the system is configured to adjust at least one operating parameter of, or compensation for, the antenna by selecting and/or varying one or more of the matching circuits or systems based on the determined adjustment position, circumference, configuration or length of the strap or data indicative thereof.

22. A system for automatically gathering information on a performance of a sports action involving an object being hit or struck, the system comprising:

one or more tags configured to be coupled on a piece of sports equipment, wherein the one or more tags comprise at least one Radio Frequency Identification (RFID) or Near Field Communication (NFC) tag, and a wearable device comprising:
a strap,
one or more swing sensors and at least one object contact sensor, the one or more swing sensors and the at least one object contact sensor being provided on the at least one wearable device, the at least one object contact sensor being configured to detect a contact with the object, the wearable device being configured to activate the at least one object contact sensor due to or responsive to detected swing motion readings from the one or more swing sensors, and a tag reader provided in and extending along or around the strap, wherein the tag reader comprises an antenna, the antenna being formed as part of a flexible printed circuit board (PCB), and the tag reader having a range of detection of at least 9 cm, wherein the antenna extends longitudinally along the strap such that when a user wears the at least one wearable device and holds the piece of sports equipment, the antenna is located at an underside of a wrist of the user to communicate with the one or more tags spaced apart from the antenna, the tag reader comprising a Radio Frequency Identification (RFID) or Near Field Communication (NFC) tag reader, wherein the system comprises or is configured to communicate with the one or more tags, applied, affixed, affixable or mountable to the piece of equipment or golf club, the system being adapted to automatically detect when the piece of sports equipment or golf club is being used to hit or strike the object, and/or which piece or what type of equipment or golf club is being used to hit or strike the object, and the at least one tag is attachable to a part of the sports equipment that is adjacent, proximate or gripped by a player or user, the at least one tag is configured to screw into or otherwise attach to the top of a handle or grip of the piece of sports equipment or golf club or be located or locatable at least partly inside the handle or grip of the piece of sports equipment or golf club and/or the tag is configured such that at least part or all of the tag is located or locatable underneath or within a grip or handle of the piece of sports equipment or golf club, wherein the system comprises or is configured to communicate with a tag reader for reading the tags, and the tag reader is comprised in or mounted or mountable on the at least one wearable, device, and wherein the system is configured to determine proximity between the tag and tag reader and determine when a piece of sports equipment or golf club is being held when the at least one tag on the piece of equipment is adjacent or proximate to all or part of the tag reader, and wherein all or part of the tag reader is located or locatable on the underside of a wrist of the player or user, and wherein further the antenna is comprised in or around a strap of the wearable device, wherein the strap is adjustable to vary an adjustment position, circumference, configuration or length of the strap, and wherein the system comprises a strap sensor that is configured to determine the adjustment position, circumference, configuration or length of the strap or data indicative thereof and the system is configured to adjust at least one operating parameter of, or compensation for, the antenna based on the determined adjustment position, circumference, configuration or size of the strap or the data indicative thereof, the system comprises a plurality of antenna matching circuits or systems, and/or an adjustable matching circuit or system, wherein the system is configured to adjust at least one operating parameter of, or compensation for, the antenna by selecting and/or varying one or more of the matching circuits or systems based on the determined adjustment position, circumference, configuration or length of the strap or data indicative thereof, the strap sensor comprises or is in communication with one or more first contacts on a first end or part of the strap and one or more second contacts on a second end or part of the strap, wherein one or more of the first contacts contact or are selectively contactable with one or more of the second contacts when the strap is closed or secured and the one or more first and second contacts are linked by a conductor configured to allow a measurement circuit to be completed by contact between the one or more first and second contacts and the system is configured to determine the adjustment position, circumference, configuration or size of the strap based on at least one electrical property of the measurement circuit measured by a strap sensor.

23. A system for automatically gathering information on a performance of an action involving an object being hit or struck, the system comprising:

one or more tags configured to be coupled on the piece of equipment;

at least one wearable device comprising a strap;

at least one object contact sensor on the at least one wearable device and configured to detect a contact with an object; and a tag reader provided in or extending along or around the strap, wherein the system comprises or is configured to communicate with the one or more tags, applied, affixed, affixable or mountable to the piece of equipment or gulf club, the system being adapted to automatically detect when the piece of equipment or golf club is being used, to hit or strike the object, and/or which piece or what type of equipment or golf club is being used, to hit or strike the object, the at least one tag is attachable to a part of the equipment that is adjacent, proximate or gripped by a player or user, the at least one tag is configured to screw into or otherwise attach to the top of a handle or grip of the piece of equipment or golf club or be located or locatable at least partly inside the handle or grip of the piece of equipment or golf club and/or the tag is configured such that at least part or all of the tag is located or locatable underneath or within a grip or handle of the piece of equipment or golf club, the system comprises or is configured to communicate with a tag reader for reading the tags, and the tag reader is comprised in or mounted or mountable on the at least one wearable, portable device, the system is configured to determine proximity between the tag and tag reader and determine when a piece of equipment or golf club is being held when the at least one tag on the piece of equipment is adjacent or proximate to all or part of the tag reader, all or part of the tag reader is located or locatable on the underside of a wrist of the player or user, the tag reader comprises an antenna, wherein the antenna is comprised in or around a strap of the wearable device, the strap is adjustable to vary an adjustment position, circumference, configuration or length of the strap, the system comprises a strap sensor that is configured to determine the adjustment position, circumference, configuration or length of the strap or data indicative thereof and the system is configured to adjust at least one operating parameter of, or compensation for, the antenna based on the determined adjustment position, circumference, configuration or size of the strap or the data indicative thereof, the system comprises a plurality of antenna matching circuits or systems, and/or an adjustable matching circuit or system, wherein the system is configured to adjust at least one operating parameter of, or compensation for, the antenna by selecting and/or varying one or more of the matching circuits or systems based on the determined adjustment position, circumference, configuration or length of the strap or data indicative thereof.

* * * * *